(12) United States Patent
Ishiguro

(10) Patent No.: US 8,395,727 B2
(45) Date of Patent: Mar. 12, 2013

(54) VA MODE LIQUID CRYSTAL DISPLAY DEVICE

(75) Inventor: Makoto Ishiguro, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 479 days.

(21) Appl. No.: 12/627,375

(22) Filed: Nov. 30, 2009

(65) Prior Publication Data
US 2011/0128473 A1    Jun. 2, 2011

(51) Int. Cl.
*G02F 1/1335* (2006.01)

(52) U.S. Cl. ............. 349/96; 349/98; 349/99; 349/117; 349/120

(58) Field of Classification Search .............. 349/96–99, 349/117–120
See application file for complete search history.

(56) References Cited

U.S. PATENT DOCUMENTS

| | | | |
|---|---|---|---|
| 6,141,075 | A | 10/2000 | Ohmuro et al. |
| 7,420,632 | B2 | 9/2008 | Tanaka et al. |
| 7,538,841 | B2 | 5/2009 | Murakami et al. |
| 7,671,947 | B2 | 3/2010 | Nimura et al. |
| 7,812,901 | B2 | 10/2010 | Kinjo et al. |
| 2004/0119924 | A1 | 6/2004 | Takeda et al. |
| 2005/0219443 | A1 | 10/2005 | Tanaka et al. |
| 2006/0238684 | A1* | 10/2006 | Kiya et al. ................ 349/118 |
| 2006/0268208 | A1 | 11/2006 | Murakami et al. |
| 2008/0173215 | A1* | 7/2008 | Sakurazawa et al. .... 106/168.01 |
| 2008/0309860 | A1 | 12/2008 | Nimura et al. |
| 2009/0046107 | A1* | 2/2009 | Asao et al. ................ 345/597 |
| 2009/0051856 | A1* | 2/2009 | Sugiyama et al. ............ 349/96 |
| 2009/0109378 | A1* | 4/2009 | Morishima ................ 349/96 |
| 2009/0111981 | A1* | 4/2009 | Kuwabara et al. ............. 536/63 |
| 2009/0122243 | A1 | 5/2009 | Sugiyama et al. |
| 2009/0161045 | A1 | 6/2009 | Kawamoto et al. |
| 2009/0180059 | A1* | 7/2009 | Fukuda et al. ................ 349/96 |
| 2009/0244454 | A1* | 10/2009 | Watanabe et al. ............ 349/117 |
| 2009/0296213 | A1* | 12/2009 | Ito ................ 359/485 |
| 2010/0081768 | A1* | 4/2010 | Kizu et al. ................ 525/211 |
| 2010/0141873 | A1 | 6/2010 | Kinjo et al. |
| 2011/0109850 | A1* | 5/2011 | Hasegawa et al. ............. 349/96 |

FOREIGN PATENT DOCUMENTS

| | | |
|---|---|---|
| JP | 3282986 B2 | 5/2002 |
| JP | 3556159 B2 | 8/2004 |
| JP | 2005-099499 A | 4/2005 |
| JP | 3666666 B2 | 6/2005 |
| JP | 2005-234431 A | 9/2005 |

(Continued)

OTHER PUBLICATIONS

International Search Report (PCT/ISA/210) issued in PCT/JP2009/006460, Feb. 9, 2010, ISA, JP.

(Continued)

*Primary Examiner* — Huyen Ngo
(74) *Attorney, Agent, or Firm* — Buchanan Ingersoll & Rooney PC

(57) ABSTRACT

The present invention relates to a VA-mode liquid-crystal display device comprising a front-side polarizing element (14), a rear-side polarizing element (12), a VA-mode liquid-crystal cell (LC) disposed between the front-side polarizing element and the rear-side polarizing element, and a first retardation region (16) comprising one or more retardation layers between the rear-side polarizing element and the VA-mode liquid-crystal cell, wherein the first retardation region satisfies 0 nm≦Re(590)≦10 nm, and |Rth(590)|≦25 nm. Re(λ) means retardation (nm) in plane at a wavelength λ nm, and Rth(λ) means retardation (nm) along the thickness direction at a wavelength λ nm.

19 Claims, 1 Drawing Sheet

FOREIGN PATENT DOCUMENTS

| | | |
|---|---|---|
| JP | 2005-258004 A | 9/2005 |
| JP | 2005-316439 A | 11/2005 |
| JP | 2006-184640 A | 7/2006 |
| JP | 2006-241293 A | 9/2006 |
| JP | 2006-293255 A | 10/2006 |
| JP | 2007-4123 A | 1/2007 |
| JP | 3996178 B1 | 10/2007 |
| JP | 2007-322988 A | 12/2007 |
| JP | 2008-9388 A | 1/2008 |
| JP | 2008-040309 A | 2/2008 |
| JP | 2009-015292 A | 1/2009 |
| JP | 2009-042446 A | 2/2009 |
| JP | 2009-053653 A | 3/2009 |
| JP | 2009-223305 A | 10/2009 |
| WO | WO 2007/129464 A1 | 11/2007 |
| WO | WO 2008/078764 | 7/2008 |

OTHER PUBLICATIONS

Written Opinion (PCT/ISA/237) issued in PCT/JP2009/006460, Feb. 9, 2010, ISA, JP.

International Preliminary Report on Patentability (PCT/ISA/373) issued in corresponding PCT/JP2009/006460 dated Jul. 10, 2012.

English Translation of Written Opinion (PCT/ISA/237) issued in PCT/JP2009/006460 dated Feb. 9, 2010.

Office Action issued in corresponding Japanese Patent Application No. 2009-221137 dated Nov. 20, 2012.

* cited by examiner (a)

| | Retardation of First Retardation Film | Influence on Front Contrast |
|---|---|---|
| CF member | low | ↓↓ |
| Liquid-Crystal Layer | low | ↓ |
| Array member | low | ↑↑↑ |

(b)

VA MODE LIQUID CRYSTAL DISPLAY DEVICE

TECHNICAL FIELD

The present invention relates to a VA (vertically aligned)-mode liquid-crystal display device improved in the front contrast ratio.

BACKGROUND ART

These days elevation of the contrast ratio (CR) in liquid-crystal display devices is being promoted. In particular, a VA-mode liquid-crystal display device has the advantage that CR in the normal direction (hereinafter referred to as "front CR") is high as compared with that in other modes, and various studies and developments are now made for further enhancing the advantage. As a result, in these 6 years, the front CR in VA-mode liquid-crystal display devices has increased from about 400 to about 8000, or by about 20 times.

On the other hand, in liquid-crystal display devices, it is important that not only the front CR is high but also CR in oblique directions (hereinafter this may be referred to as "viewing angle CR") is high. Various techniques of using a retardation film have been proposed for reducing the light leakage in oblique directions at black states of VA-mode liquid-crystal display devices (for example, JP-A 2006-184640). In general, a retardation film is disposed on both the front side and the rear side of the liquid-crystal cell existing in the center therebetween, in which the two retardation films share the retardation necessary for optical compensation in the display device. In general, two systems of the combination are employed for optical compensation. In one system, the retardation films each separately disposed on the front side and on the rear side equally share the same retardation; and the advantage of the system is that the films of the same type can be used therein. In other system, the retardation film disposed on either one side is made to share a larger retardation; and the system is advantageous in point of the cost since it enables optical compensation by the use of a combination of inexpensive retardation films. In the latter system, in general, the retardation film to be disposed on the rear side is made to share a larger retardation in practical use. One reason is the production cost. Regarding this reason, JP-A 2006-241293 says as follows in the paragraph [0265]: "In case where the cellulose acylate film of the invention is used as the protective film of the polarizer (between the liquid-crystal cell and the polarizing film), this may be on either side of the upper polarizer (viewers' side) or the lower polarizer (backlight side) with no functional problem. However, when it is used on the side of the upper polarizer, the functional film must be provided on the viewers' side (upper side) and the producibility may be thereby lowered, and therefore, it may be used on the side of the lower polarizer in many cases, and this may be a more preferred embodiment." The second reason is that disposing the film having a larger retardation on the rear side is preferred from the viewpoint of the impact resistance and the resistance to environmental change including temperature change and humidity change.

Heretofore, nothing has been investigated about the relationship between the optical properties and the front CR of the retardation film used for improving the viewing angle CR.

DISCLOSURE OF THE INVENTION

For high-CR liquid-crystal display devices, it is difficult to further elevate the contrast ratio therein according to the techniques heretofore proposed based on the factors of CR reduction. The present inventors have assiduously studied and, as a result, have found that in a VA-mode liquid-crystal display device, the retardation of the retardation layer existing between the rear-side polarizing element and the liquid-crystal cell, which heretofore has not been considered to have some influence on the front CR, is one factor of reducing the front CR.

An object of the present invention is to provide a VA-mode liquid-crystal display device having a high front contrast ratio.

The means for achieving the above-described object are as follows.

[1] A VA-mode liquid-crystal display device comprising a front-side polarizing element, a rear-side polarizing element, a VA-mode liquid-crystal cell disposed between the front-side polarizing element and the rear-side polarizing element, and a first retardation region comprising one or more retardation layers between the rear-side polarizing element and the VA-mode liquid-crystal cell, wherein the first retardation region satisfies the following formulae:

$$0 \text{ nm} \leq Re(590) \leq 10 \text{ nm, and } |Rth(590)| \leq 25 \text{ nm,}$$

wherein $Re(\lambda)$ means retardation (nm) in plane at a wavelength $\lambda$ nm, and $Rth(\lambda)$ means retardation (nm) along the thickness direction at a wavelength $\lambda$ nm.

[2] The VA-mode liquid-crystal display device of [1], wherein the VA-mode liquid-crystal cell comprises a front-side substrate and a rear-side substrate, and the ratio of the member-contrast ratio of the front-side substrate $CR_f$ to the member-contrast ratio of the rear-side substrate $CR_r$, $CR_f/CR_r$, is equal to or more than 3.

[3] The VA-mode liquid-crystal display device of [1], comprising a second retardation region comprising one or more retardation layers between the front-side polarizing element and the VA-mode liquid-crystal cell, wherein the second retardation region satisfies the following formulae:

$$30 \text{ nm} \leq Re(590) \leq 90 \text{ nm, and}$$

$$170 \text{ nm} \leq Rth(590) \leq 300 \text{ nm.}$$

[4] The VA-mode liquid-crystal display device of [3], wherein the first and second retardation regions satisfy the following formula:

$$\Delta nd(590)-70 \leq Rth_1(590)+Rth_2(590) \leq \Delta nd(590)-10,$$

wherein d means the thickness (nm) of the liquid-crystal layer of the VA-mode liquid-crystal cell, $\Delta n(\lambda)$ means refractivity anisotropy at a wavelength $\lambda$ of the liquid-crystal layer of the VA-mode liquid-crystal cell, $\Delta nd(\lambda)$ means a product of $\Delta n(\lambda)$ and d, $Rth_1(\lambda)$ means retardation (nm) along the thickness direction in the first retardation region at a wavelength $\lambda$, and $Rth_2(\lambda)$ means retardation (nm) along the thickness direction in the second retardation region at a wavelength $\lambda$.

[5] The VA-mode liquid-crystal display device of any one of [1] to [4], wherein the first retardation region is formed of a cellulose acylate film or contains a cellulose acylate film.

[6] The VA-mode liquid-crystal display device of [5], wherein the cellulose acylate film contains at least one compound that reduces retardation along the thickness direction Rth within a range satisfying the following formulae (I) and (II):

(I) $(Rth[A]-Rth[0])/A \leq -1.0,$ (II) $0.01 \leq A \leq 30,$ wherein Rth[A] means Rth (nm) of the film containing the Rth-reducing compound in an amount of A %, Rth[0] means Rth (nm) of the film not containing the Rth-reducing compound, and "A" means the mass (%) of the compound relative to the mass, 100, of the starting polymer for the film.

[7] The VA-mode liquid-crystal display device of [5] or [6], wherein the cellulose acylate film comprises a cellulose acylate having a degree of acyl substitution of from 2.85 to 3.00 and contains at least one compound capable of reducing retardation in plane, Re, and retardation along the thickness direction, Rth, in an amount of from 0.01 to 30% by mass relative to the solid content of the cellulose acylate.

[8] The VA-mode liquid-crystal display device of any one of [5] to [7], wherein the cellulose acylate film contains at least one compound capable of reducing |Re(400)−Re(700)| and |Rth(400)−Rth(700)| of the film, in an amount of from 0.01 to 30% by mass relative to the solid content of the cellulose acylate.

[9] The VA-mode liquid-crystal display device of any one of [1] to [8], wherein the first retardation region is formed of an acrylic polymer film or contains an acrylic polymer film.

[10] The VA-mode liquid:crystal display device of [9], wherein the first retardation region is formed of an acrylic polymer film containing an acrylic polymer with at least one unit selected from a lactone ring unit, a maleic anhydride unit and a glutaric anhydride unit, or contains that acrylic polymer film.

[11] The VA-mode liquid-crystal display device of [3] to [10], wherein the second retardation region is formed of a cellulose acylate film or contains a cellulose acylate film.

[12] The VA-mode liquid-crystal display device of any one of [3] to [10], wherein the second retardation region is formed of a cyclic olefin polymer film or contains a cyclic olefin polymer film.

[13] The VA-mode liquid-crystal display device of any one of [1] to [12], which has a front contrast ratio of equal to or more than 1500.

[14] The VA-mode liquid-crystal display device of any one of [1] to [13], which comprises a backlight unit sequentially emitting independent three primary colors and is operated according to a field sequential operation mode.

EFFECT OF THE INVENTION

According to the invention, it is possible to provide a VA-mode liquid-crystal display device having a high front contrast ratio.

Figure 1:
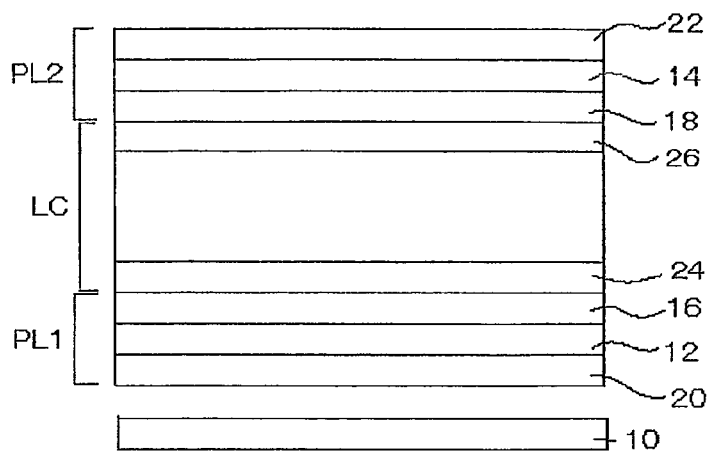
FIG. 1 is a schematic cross-sectional view of one example of the VA-mode liquid-crystal display device.

In the drawings, the reference numerals and signs have the following meanings.

10 Backlight
12, 14 Polarizing Element
16 First Retardation Film (first retardation region)
18 Second Retardation Film (second retardation region)
20, 22 Outer Protective Film
LC VA-mode Liquid-Crystal Cell
PL1 Rear Polarizer
PL2 Front Polarizer

MODE FOR CARRYING OUT THE INVENTION

The invention is described in detail hereinunder. Note that, in this patent specification, any numerical expressions in a style of " . . . to . . . " will be used to indicate a range including the lower and upper limits represented by the numerals given before and after "to", respectively.

At first, the terms used in the description will be explained.
(Retardation, RE and Rth)

In this description, $Re(\lambda)$ and $Rth(\lambda)$ are retardation in plane (nm) and retardation along the thickness direction (nm), respectively, at a wavelength of $\lambda$. $Re(\lambda)$ is measured by applying light having a wavelength of $\lambda$ nm to a sample such as a film in the normal direction thereof, using KOBRA 21ADH or WR (by Oji Scientific Instruments). The standard wavelength of KOBRA is 590 nm.

When a sample to be analyze by a monoaxial or biaxial index ellipsoid, $Rth(\lambda)$ of the film is calculated as follows.

$Rth(\lambda)$ is calculated by KOBRA 21ADH or WR based on six $Re(\lambda)$ values which are measured for incoming light of a wavelength $\lambda$ nm in six directions which are decided by a 10° step rotation from 0° to 50° with respect to the normal direction of a sample film using an in-plane slow axis, which is decided by KOBRA 21ADH, as an tilt axis (a rotation axis; defined in an arbitrary in-plane direction if the film has no slow axis in plane); a value of hypothetical mean refractive index; and a value entered as a thickness value of the film.

In the above, when the film to be analyzed has a direction in which the retardation value is zero at a certain tilt angle, around the in-plane slow axis from the normal direction as the rotation axis, then the retardation value at the tilt angle larger than the tilt angle to give a zero retardation is changed to negative data, and then the $Rth(\lambda)$ of the film is calculated by KOBRA 21ADH or WR.

Around the slow axis as the tilt angle (rotation angle) of the film (when the film does not have a slow axis, then its rotation axis may be in any in-plane direction of the film), the retardation values are measured in any desired tilted two directions, and based on the data, and the estimated value of the mean refractive index and the inputted film thickness value, Rth may be calculated according to the following formulae (X) and (XI):

$$Re(\theta) = \left[nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}}\right] \times \frac{d}{\cos\left\{\sin^{-1}\left(\frac{\sin(-\theta)}{nx}\right)\right\}} \quad (X)$$

$$Rth = \left(\frac{nx+ny}{2} - nz\right) \times d \quad (XI)$$

wherein $Re(\theta)$ represents a retardation value in the direction tilted by an angle $\theta$ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the sample.

When the sample such as a film to be analyzed is not expressed by a monoaxial or biaxial index ellipsoid, or that is, when the film does not have an optical axis, then $Rth(\lambda)$ of the film may be calculated as follows:

$Re(\lambda)$ of the film is measured around the slow axis (judged by KOBRA 21ADH or WR) as the in-plane tilt axis (rotation axis), relative to the normal direction of the film from −50 degrees up to +50 degrees at intervals of 10 degrees, in 11 points in all with a light having a wavelength of λ nm applied in the tilted direction; and based on the thus-measured retardation values, the estimated value of the mean refractive index and the inputted film thickness value, Rth(λ) of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some major optical films are listed below:

cellulose acylate (1.48), cycloolefin polymer (1.52), polycarbonate (1.59), polymethylmethacrylate (1.49) and polystyrene (1.59).

KOBRA 21ADH or WR calculates nx, ny and nz, upon enter of the hypothetical values of these mean refractive indices and the film thickness. Base on thus-calculated nx, ny and nz, Nz=(nx−nz)/(nx−ny) is further calculated.

In the invention, "slow axis" of retardation films and others means the direction in which the refractive index is the largest. "Visible light region" means from 380 nm to 780 nm. Unless otherwise specifically indicated, the refractive index is one measured at λ=590 nm in the visible light region. In the technical field to which the invention belongs, the wavelength of 590 nm is used for regulating the properties of films.

In this description, the numerical data, the numerical range and the qualitative expression (for example, "equivalent", "same", etc.) indicating the optical properties of constitutive components such as retardation region, retardation film, film, liquid-crystal layer and others should be so interpreted as to indicate the numerical data, the numerical range and the qualitative expression that include the error range generally acceptable for liquid-crystal display devices and their constitutive components.

In this description, the retardation film means a self-supporting film disposed between a liquid-crystal cell and a polarizing element (irrespective of the level of retardation). The retardation region is a generic term for one or more layers of a retardation film disposed between a liquid-crystal cell and a polarizing element.

In this description, "front side" means the display panel side; and "rear side" means the backlight side. In this description, "front" means the normal direction relative to the display panel; and "front contrast ratio (CR)" means the contrast ratio computed from the white brightness and the black brightness measured in the normal direction to the display panel.

The invention relates to a VA-mode liquid-crystal display device having, between the VA-mode liquid-crystal cell and the rear side polarizing element, a first retardation region satisfying the following formulae:

0 nm≦Re(590)≦10 nm, and |Rth(590)|≦25 nm.

Heretofore, as the backlight to be disposed on the rear side as the light source for a liquid-crystal display device, a backlight capable of emitting oriented light is used. The light from the backlight to a liquid-crystal display device in an oblique direction is scattered through the liquid-crystal layer in the liquid-crystal cell and the color filter, and the light component scattered in the front direction is one factor of reducing the front CR. As a result of investigations, the present inventors have known that, in case where the light from a backlight to a rear-side polarizing element passes through a retardation region before it comes in a liquid-crystal cell, the reduction in the front CR is remarkable. The reasons are as follows:

(i) In case where the linear polarized light from a backlight having run through a rear-side polarizing element in an oblique direction passes through a retardation region before it enters a liquid-crystal cell, the light is elliptically polarized owing to Re and/or Rth in the retardation region and, after that, the light is scattered to the front through the liquid-crystal layer in the liquid-crystal cell and a color filter layer or the like. Of the light scattered on the front, the component in the absorption axis direction of the front-side polarizing element (hereinafter this may be referred to as "component A") is absorbed by the polarizing element, but the component in the transmission axis direction of the front-side polarizing element (hereinafter this may be referred to as "component B") runs through the polarizing element. The component B is the cause of reduction in the front CR. When the component B is reduced, then the front contrast ratio may be enhanced. From this viewpoint, Rth in the retardation region positioned between the rear-side polarizing element and the liquid-crystal cell is preferably as small as possible. And (ii) The retardation film to constitute a retardation region has an optical axis distribution owing to its production, and this causes axial deviation in sticking the film to a polarizing element. The axial deviation promotes the elliptical polarization of the light from a backlight; and therefore, when the axial deviation is reduced, then the front contrast ratio can be enhanced. From this viewpoint, Re in the retardation region positioned between the rear-side polarizing element and the liquid-crystal cell is preferably as small as possible.

Based on the above findings (i) and (ii), the inventors have further investigated and, as a result, have found that, when the first retardation region between the rear-side polarizing element and the liquid-crystal cell satisfies the following formulae:

0 nm≦Re(590)≦10 nm, and |Rth(590)|≦25 nm, then a VA-mode liquid-crystal display device having a high front CR can be obtained, and have completed the present invention. Specifically, according to the invention having the above-mentioned constitution, there is provided a VA-mode liquid-crystal display device having a high front CR. In the invention, only a retardation film having a low Re and a low Rth is disposed in the retardation region between the rear-side polarizing element and the liquid-crystal cell, and therefore, even when the polarizing element is deformed by the heat from the backlight to thereby give stress to the retardation film, the change in the optical anisotropy of the retardation film naturally having a low Re and a low Rth is extremely small. As a result, the light leakage occurring at the four corners of the display panel, which appears in conventional VA-mode liquid-crystal display devices, or that is, the trouble of so-called corner unevenness to degrade the display quality can be reduced.

Further, according to an embodiment of the invention where the second retardation region between the front-side polarizing element and the liquid-crystal cell has predetermined optical properties, there is provided a liquid-crystal display device in which the oblique contrast ratio, CR is bettered and the color shift at the time of the black state is reduced.

FIG. 1 shows a schematic cross-sectional view of one example of the VA-mode liquid-crystal display device. In the drawing, the relative relationship in the thickness between the constitutive layers does not always correspond to the relative relationship in the thickness between the constitutive layers of an actual liquid-crystal display device.

The VA-mode liquid-crystal display shown in FIG. 1 comprises a VA-mode liquid-crystal cell LC, and a rear-side polarizer PL1 and a front-side polarizer PL2 between which the cell is sandwiched. Outside the rear-side polarizer PL1, disposed is a backlight 10, and the device is so designed that the light from the backlight 10 runs through the rear-side polarizer PL1, the liquid-crystal cell LC and the front-side polarizer PL2 in that order. The liquid-crystal cell LC is a VA-mode liquid-crystal cell, and at the time of the black state, the liquid-crystal molecules therein are homeotropically aligned. The liquid-crystal cell LC is configured by opposing an upper substrate 26 and a lower substrate 24 of glass or the like, in which an alignment layer (not shown) and an electrode layer (not shown) are formed on each substrate, and a color filter layer (not shown) is formed on the front-side substrate.

The rear-side polarizer PL1 comprises a polarizing element 12, and, as provided on the surfaces of thereof, a first retardation film 16 and an outer protective film 20; and the front-side polarizer PL2 comprises a polarizing element 14, and, as provided on the surfaces of thereof, a second retardation film 18 and an outer protective film 22. The polarizing elements 12 and 14 are so disposed that their absorption axes are perpendicular to each other. The first retardation film disposed between the polarizing element 12 of the rear-side polarizer PL1 and the liquid-crystal cell LC is a retardation film satisfying 0 nm≦Re(590)≦10 nm and |Rth(590)|≦25 nm. Satisfying the requirements, the first retardation film therebetween may be composed of plural retardation films. For example, between the first retardation film 16 and the polarizing element 12, a protective film for the polarizing element 12 may be separately disposed, but total retardation of the first retardation film 16 and the protective film must satisfy 0 nm≦Re(590)≦10 nm and |Rth(590)|≦25 nm. To that effect, plural retardation films may exist between the polarizing element 12 and the liquid-crystal cell LC, but total retardation of those plural retardation films must satisfy the above requirements. The retardation film disposed between the polarizing element 12 and the liquid-crystal cell LC satisfies the above requirements, and therefore, in the VA-mode liquid-crystal display device of FIG. 1, the incident light from the backlight 10 in oblique directions is prevented from being elliptically polarized before coming in the liquid-crystal cell LC. As a result, the contrast ratio reduction owing to the reasons (i) and (ii) mentioned above can be reduced, and the display device can attain a high front CR.

As a result of assiduous investigations, the present inventors have found that the advantage of the invention is more remarkable in an embodiment where the member-contrast ratio $CR_f$ of the front-side substrate of the VA-mode liquid-crystal cell (including the substrate 26 and all the parts formed on the substrate in FIG. 1) is higher than the part substrate $CR_r$ of the rear-side substrate thereof (including the substrate 24 and all the parts formed on the substrate in FIG. 1). Further, in an embodiment where the ratio of the member-contrast ratio of the front-side substrate $CR_f$ to the member-contrast ratio of the rear-side substrate $CR_r$, $CR_f/CR_r$, is equal to or more than 3, or that is 3≦CRf/CRr, the advantage of the invention is even more remarkable. Here, when VA-mode liquid-crystal cell (LC in FIG. 1) is taken apart into the individual two substrates (substrate 24 and substrate 26 in FIG. 1), the front-side substrate (substrate 26 in FIG. 1) and the parts formed on the substrate are referred to as a generic term "front-side substrate"; and the rear-side substrate (substrate 24 in FIG. 1) and the parts formed on the substrate are referred to as a generic term "rear-side substrate". Examples of the parts include various parts such as a color filter, a black matrix, an array part (TFT array, etc.), projections on the substrate, a common electrode, a slit, etc. Specifically, the member-contrast ratio of the rear-side substrate and the front-side substrate of the liquid-crystal cell means the total contrast ratio of each substrate and all the parts formed on each substrate. The details of the method for measuring it are described in the section of Examples given below.

As a result of assiduous investigations, the present inventors have known that the front CR of a liquid-crystal display device is significantly influenced by retardation in the first retardation region between the rear-side polarizing element and the liquid-crystal cell. The reason is because there occur various optical phenomena such as scattering and diffraction in the constitutive parts of the liquid-crystal cell (e.g., liquid-crystal layer, color filter, black matrix, array part, projections formed on the substrate, common electrode part, slit part, etc.), but the optical phenomena involve polarization dependency. The details are described below.

In general, in a VA-mode liquid-crystal display device, the liquid-crystal layer is in a vertical alignment state at the time of the black state, and therefore, in that state, the polarization state of the linear polarized light having passed through the rear-side polarizing element to run in the normal direction does not change after passing through the liquid-crystal layer, and in principle, the light is all absorbed at the absorption axis of the front-side polarizing element. Specifically, in principle, it may be said that, at the time of the black state, there is no light leakage in the normal direction. However, the front transmission at the time of the black state is not zero. It is known that one reason is because the liquid-crystal molecules in the liquid-crystal layer fluctuate, and the light having come into the liquid-crystal layer is scattered in some degree by the fluctuation. When the light having come into the liquid-crystal layer contains completely only the linear polarized component to be absorbed at the absorption axis of the front-side polarizing element, the influence may be greater and the light leakage on the front tends to increase. Specifically, when retardation in the retardation region disposed on the rear side is larger and when the incident light is elliptically polarized at a higher elliptical polarization degree, then the light leakage on the front owing to the fluctuation can be reduced more.

However, as a result of assiduous investigations, the present inventors have known that, except the fluctuation of the liquid-crystal molecules in the liquid-crystal layer, retardation in the retardation region between the rear-side polarizing element and the liquid-crystal layer also contributes to the reason for light leakage. When the oriented light from the backlight has passed through the rear-side polarizing element and comes in the retardation region in an oblique direction, the linear polarized light is converted into elliptical polarized light owing to retardation. The elliptically-polarized light is diffracted and scattered in the array part of the liquid-crystal cell and in the color filter layer, and at least a part of the light comes to run in the front direction. The elliptically polarized light includes a linear polarized light component that could not be blocked at the absorption axis of the front-side polarizing element, and therefore, even at the time of the black state, there occurs light leakage in the front direction, therefore causing a reason for front CR reduction. The optical phenomenon to occur through the array part and the color filter part is, for example, because the surface of the array part and the color filter part is not completely smooth but is roughened in some degree and because the part may contain some scattering factors, etc. The influence of the optical phenomenon to occur through the array part and the color filter part on the light leakage in the front direction is greater than the influence thereon of the fluctuation of the liquid-crystal molecules in the liquid-crystal layer mentioned above.

As a result of further investigations, the present inventors have known that the optical phenomena (diffraction, scattering, etc.) to occur when the light elliptically polarized through the retardation region passes through the predetermined parts of the liquid-crystal cell bring about different influence modes on the light leakage in the front direction depending on as to whether the light passes through the part before coming into the liquid-crystal part or the light passes through the part after having passed through the liquid-crystal layer. In FIG. 1, for example, when an array part is disposed on the inner face of the rear-side substrate 24 and a color filter is disposed on the inner face of the front-side substrate 26 as in FIG. 2(a), the incident light passes through the array part before coming into the liquid-crystal layer, and after having passed through the liquid-crystal layer, it runs through the color filter.

In the part through which the incident light passes before coming into the liquid-crystal layer (e.g., array part), the degree of elliptical polarization of the incident light is determined by retardation in the rear-side retardation region (first retardation region) through which the light passes beforehand. On the other hand, in the part through which the incident light passes after having passed through the liquid-crystal layer (e.g., color filter), the degree of elliptical polarization of the incident light is determined by retardation of the liquid-crystal layer in addition to retardation in the rear-side retardation region. In the case of a VA-mode liquid-crystal display device, in general, $\Delta nd(590)$ of the liquid-crystal layer is defined to be from 280 to 350 nm or so. d means the thickness of the liquid-crystal layer (nm); $\Delta n(\lambda)$ means the refractivity anisotropy at a wavelength $\lambda$ of the liquid-crystal layer; and $\Delta nd(\lambda)$ is a product of $\Delta n(\lambda)$ and d. Even though retardation in the rear-side retardation region is so defined that the light leakage through the array part is reduced, the degree of elliptical polarization rather increases contrary to this, after the incident light has passed through the liquid crystal. When retardation in the rear-side retardation region is larger, then the degree of elliptical polarization of the incident light is smaller, and therefore, when retardation in the rear-side retardation region is set low, depending on the part through which the incident light passes before passing through the liquid-crystal layer or on the part through which the incident light passes after having passed through the liquid-crystal layer, the effect for the influence of the part on the light leakage in the front direction is turned back.

The level of retardation in the rear-side retardation region, the tendency of the influence of each part, through which the incident light passes, on the light leakage in the front direction, and the level of the influence are shown in FIG. 2(b). In FIG. 2(b), "↑" means the effect of elevating the front CR as compared with the case where the rear-side retardation region has high retardation, and "↓" means the effect of decreasing the front CR. The number of the arrows is a criterion of the level of the effect; and the larger number indicates a higher effect.

As in FIG. 2(b), in the embodiment of a VA-mode liquid-crystal display device where a color filter is disposed on the front-side substrate and an array part is on the rear-side substrate, when retardation in the rear-side retardation region is lowered, then the effect is toward the direction of reducing the light leakage in the front direction to be caused by the optical phenomenon by the array part disposed on the rear-side substrate, while on the other hand, the effect is toward the direction of increasing the light leakage in the front direction to be caused by the optical phenomenon by the color filter layer disposed on the front-side substrate, or that is, the two effects are in a relation of being canceled out each other.

For example, in a liquid-crystal cell where a part to be a factor of lowering the contrast ratio is disposed similarly on both the rear-side substrate and the front-side substrate, even though the first retardation region on the rear side has low retardation, the effect of elevating the front CR by the part disposed on the rear-side substrate (for example, in FIG. 2(b), the array part) may be somewhat canceled by the effect of reducing the front CR by the part disposed on the front-side substrate (for example, in FIG. 2(b), the CF part), as the case may be. Specifically, it can be said that the characteristic of the present invention that the first retardation region on the rear side has low retardation achieves an especially high effect in an embodiment where a lot of parts to contribute to reducing the contrast ratio are disposed on the rear-side substrate.

The influence of retardation in the rear-side first retardation region on the front CR is almost negligible in liquid-crystal display devices having a low front CR. However, in liquid-crystal display devices having a high front CR (for example, having a front CR of equal to or more than 1500) provided these days, the influence is not negligible for the purpose of further elevating the front CR. The invention is effective for further elevating the front CR of liquid-crystal display devices having a front CR of equal to or more than 1500.

Figure 2:
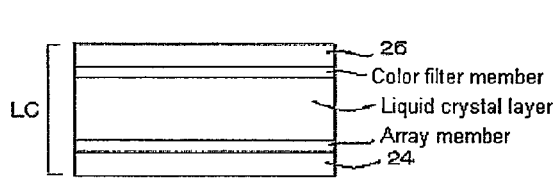
FIG. 2 is a schematic view used for explaining the effect of the invention.

In FIG. 2 showing one example of an ordinary liquid-crystal cell structure, a color filter (CF) is formed on the inner face of the front-side substrate 26 and an array part is on the inner face of the rear-side substrate 24. Apart from the ordinary liquid-crystal structure illustrated, CF and the array part may be positioned in any desired sites in the liquid-crystal display device of the invention. For example, needless-to-say, an embodiment where CF is disposed on the rear-side substrate having an array part thereon, like a color filter-on-array (COA) structure, falls in the scope of the invention. In case where the array part is disposed on the front-side substrate 26, the action of the array part may be the same as that of the CF part in FIG. 2(b); and in case where CF is disposed on the rear-side substrate 24, the action of the CF part may be the same as that of the array part in FIG. 2(b). The same shall apply to the other parts not shown (for example, black matrix); and when the part is disposed on the front-side substrate 26, then the action of the part may be the same as that of the CF part in FIG. 2(b), and when the part is disposed on the rear-side substrate 24, then the action of the part may be the same as that of the array part in FIG. 2(b).

As described in the above, the inventors have found that in the embodiment where the ratio of the member-contrast ratio of the front-side substrate (substrate 26 in FIG. 1) $CR_f$ to the member-contrast ratio of the rear-side substrate (substrate 24 in FIG. 1) $CR_r$, $CR_f/CR_r$, is equal to or more than 3, or that is $3 \leq CRf/CRr$, the advantage of the invention is more remarkable. One example of the liquid-crystal cell satisfying the relationship is, for example, a liquid-crystal cell in which the rear-side substrate is a COA substrate. COA is described in detail in JP-A 2005-99499 and 2005-258004.

As described in the above, the incident light polarization dependence of the light leakage at the time of the black state owing to the optical phenomena in CF, black matrix and array part is all in the same tendency; however, the contribution of black matrix is relatively small, and therefore the position of the black matrix in the liquid-crystal display device with COA where CF is disposed on the rear-side substrate having an array part thereon may be in any site inside the liquid-crystal cell, and preferably, the black matrix is positioned between the rear-side polarizing element and the liquid-crystal layer.

Other examples of the liquid-crystal cell satisfying $3 \leq CR_f/CR_r$ include a liquid-crystal cell not having a color filter, and a liquid-crystal cell not having a color filter and driven in a field-sequential display mode. The field-sequential mode liquid-crystal cell is described in detail in JP-A 200942446, 2007-322988, and Japanese Patent 3996178, which are incorporated herein by reference. In the field-sequential display mode, used are independent backlight units that sequentially emit lights of three primary colors. Preferred are backlight units each provided with LED as the light source; and for example, preferably used are backlight units each provided with an LED element emitting any of three colors of red, green and blue.

Even an ordinary liquid-crystal cell where an array part is disposed on the rear-side substrate and a color filter is on the front-side substrate can be a preferred embodiment of the invention needless-to-say satisfying the above-mentioned condition, $3 \leq CRf/CRr$, so far as the color filter therein has a high contrast ratio. One example of the color filter having a high contrast ratio is a color filter containing a pigment having a smaller particle size than that of the pigment to be in ordinary CF. The following two methods may be mentioned as an example of producing a high-contrast ratio color filter with a pigment.

(i) A method of mechanically more finely grinding pigment particles by the use of a disperser such as a sand mill, a roll mill, a ball mill or the like, which is described, for example, in JP-A 2009-144126 and this may be incorporated herein by reference.

(ii) A method of dissolving a pigment in a solvent followed by reprecipitating it to prepare fine pigment particles, which is described, for example, in JP-A 2009-134178.

Except pigment, a method of producing a high-contrast ratio color filter with dye is proposed. It is described in detail in JP-A 2005-173532, which may be incorporated herein by reference.

Use of the high-contrast ratio color filter may make an ordinary liquid-crystal cell satisfy $3 \leq CR_f/CR_r$.

Again FIG. 1 is referred to. Preferably, the optical properties of the second retardation film 18 which the front-side polarizer PL2 has can contribute toward elevating the contrast ratio in oblique directions and reducing the color shift at the time of the black state. As described in the above, $\Delta nd(\lambda)$ of the liquid-crystal layer of the VA-mode liquid-crystal cell LC generally from 280 to 350 nm or so. The preferred range of retardation, especially Rth of the second retardation film varies depending on the value of $\Delta nd(\lambda)$ of the liquid-crystal layer. Preferred combinations with different retardation films relative to $\Delta nd(\lambda)$ for elevating the oblique contrast ratio are described in various patent publications, for example, in Japanese Patents 3282986, 3666666 and 3556159, which may be incorporated herein by reference.

Preferred ranges of the optical properties of the second retardation region are described hereinunder.

$\Delta nd(590)$ of a VA-mode liquid-crystal cell is generally from 280 to 350 nm or so, and this is for increasing as much as possible the transmittance at the time of the white state. On the other hand, when $\Delta nd(590)$ is less than 280 nm, the white brightness may decrease slightly along with the reduction in $\Delta nd(590)$, but since the cell thickness d is small, the liquid-crystal display device can be excellent in rapid responsibility. The characteristic of the invention is that, when the rear-side first retardation region has low retardation, the light leakage in the front direction is reduced and, as a result, the front CR is elevated, and this applies to liquid-crystal display devices having any $\Delta nd(590)$.

In the embodiment of the VA-mode liquid-crystal display device of FIG. 1, the first retardation film 16 and the second retardation film 18 both function also as a protective film for the polarizing elements 12 and 14, respectively; however, the invention should not be restricted to this embodiment. For example, an additional protective film for polarizing element may be separately disposed between the first retardation film and second retardation film; and the polarizers 12 and 14. However, as described in the above, the protective film to be disposed between the first retardation film and the polarizing element 12 must satisfy the requirement for the first retardation region as a total of the laminate thereof with the first retardation film.

The rear-side polarizing element 12 has the protective film 20 on the surface thereof facing the backlight 10, and may additionally have further thereon any functional film such as antifouling film, antireflection film, antiglare film, antistatic film, etc.; and similarly, the front-side polarizing element 14 has the protective film 22 on the surface thereof facing the panel side, and may additionally have further thereon any functional film such as antifouling film, antireflection film, antiglare film, antistatic film, etc.

As described in the above, in a system where one side shares large retardation for optical compensation, heretofore, the film having large retardation is generally disposed on the rear side; however, it is considered that, in case where the high-retardation film is disposed on the front side, as in the present invention, the yield of polarizer may increase. The reason is described below.

The high-retardation film requires a step of stretching it at a high draw ratio, and therefore, its width could hardly be broadened, as compared with inexpensive films not requiring many additives in their production, or that is, so-called plane TAC (triacetyl cellulose film having Re of from 0 to 10 nm and Rth of from 30 to 80 nm), or low-retardation films. In ordinary liquid-crystal display devices, a wide liquid-crystal cell is used, and in general, the absorption axis of the front-side polarizing element is disposed in the horizontal direction (in the width direction) while the absorption axis of the rear-side polarizing element is disposed in the vertical direction (in the length direction). Further, in industrial-scale mass-production, the polarizing element and the retardation film are stuck together generally in a roll-to-roll system. Taking the matter into consideration that the polarizer produced according to the method is stuck to the liquid-crystal cell, it is recommended to dispose the high-retardation film on the front side for efficiently using the width direction of the polarizer, or that is, the production yield is increased. In case where a low-retardation film is disposed on the rear side as in the present invention, the film can be readily prepared as a wide film, and it can be combined with a wide polarizing element to further increase the production yield. As a result, the amount of the polarizer to be wasted may be reduced.

This is described with reference to concrete numerical data. In general, the width of a retardation film is 1100 mm, 1300 mm, 1500 mm, 2000 mm or 2500 mm; and the thickness of the film is about 25 μm, 40 μm or 80 μm. The length of the roll of the film is about 2500 m or 4000 m. On the other hand, regarding the panel size of a VA-mode liquid-crystal display device for application to TV, the panel size may be 20 inches, 32 inches, 40 inches, 42 inches, 52 inches or 68 inches. As one example, 42-inch panels most popularly released at present are discussed here. The 42-inch panel (standard 4:3) has a panel width of 853 mm (42-inch wide panel 16:9 has 930 mm), and a panel height of 640 mm (42-inch wide panel has 523 mm). In a conventional ordinary system where a high-retardation film is disposed on the rear side, only one retardation film for panel could be taken from a retardation film having, for example, a width of 1300 mm or 1500 mm in the width direction thereof. However, in the embodiment of the present invention, a high-retardation film is disposed on the front side, and therefore, even a retardation film having a width of, for example, 1300 mm or 1500 mm could be so cut that the height of the thus-cut film piece corresponding to the height of the panel size could be in the width direction of the film, or that is, retardation films for two panels can be taken in the width direction, and the producibility may be doubled. The TV size is increasing year by year, and for example, a 65-inch (standard) TV has a panel width of 991 mm and a panel height of 1321 mm. In conventional ordinary rear-side disposition in such a wide-view TV, even a wide-sized 2000-mm film could give only one retardation film for one panel in the width direction. Contrary to this, in the front-side disposition as in the embodiment of the present invention, the film can give retardation films for two panels in the width direction. Further, a 68-inch (wide-view) TV has a panel width of 1505 mm and a panel height of 846 mm, for which about doubled producibility can be expected similarly.

The VA-mode liquid-crystal display device of the invention can be driven in any mode, concretely in any mode of MVA (Multi-Domain Vertical Alignment), PVA (Patterned Vertical Alignment), OP (Optical Alignment) or PSA (Polymer-Sustained Alignment). The details of these modes are described in JP-A 2006-215326, and JP-T 2008-538819.

As describe in the above, a high-contrast ratio color filter may be used in the invention; however, needless-to-say, any ordinary color filter for ordinary liquid-crystal display devices may also be used. The color filter generally comprises a plurality of different colors (e.g., three primary colors of light, red, green and blue, and transparent, yellow, cyan, etc.) in the pixel sites of the substrate. Various methods for its production are known. For example, generally employed is a method of preparing a coloring photosensitive composition (including a colorless composition) referred to as a color resist using a coloring material (organic pigment, dye, carbon black, etc.), applying it onto a substrate to form a layer thereon, and patterning it through photolithography. Various methods are also known for applying the coloring photosensitive composition onto a substrate. For example, in early times, a spin coater method was employed; and from the viewpoint of saving the coating composition, a slit-and-spin coater method has become employed; and at present, a slit coater method is generally employed. In addition, also known are a roll coating method, a bar coating method, a die coating method, etc. Recently, another method has become employed, comprising patterning to form partitioning walls through lithography followed by forming image colors according to an inkjet system. Apart from these, further known are a method of combining a coloring non-photosensitive composition and a photosensitive positive resist, a printing method, an electrodeposition method, and a film transfer method. The filter for use in the invention may be produced in any method.

The material for forming the color filter is not also specifically defined. As the coloring material, usable is any of dye, organic pigment, inorganic pigment, etc. Use of dye has been investigated for satisfying the requirement for contrast ratio elevation; and recently, the technique of dispersing organic pigment has been promoted, and broken-down pigment prepared by finely breaking pigment in a salt-milling method, as well as fine pigment particles prepared by a built-up method have become used for contrast ratio elevation. In the invention, any coloring material may be used.

In the invention, the front contrast ratio may be further elevated by controlling the angle profile of the incident light from the backlight. Concretely, when a backlight having a higher power of gathering light is used, the absolute value of the front contrast ratio increases, and therefore the increase in the absolute value of the front CR indicated in the invention may be larger. The index of light-gathering power may be represented, for example, by the ratio of the outgoing light intensity on the front) I(0° to the outgoing light intensity at a polar angle of 45 degrees) I(45°), I(0°)/I(45°); and a backlight having a larger value of the ratio may be said to have a backlight having a stronger light-gathering power. As the backlight having a high light-gathering power, preferably, a prism film (prism layer) having a light-gathering function is provided between the diffusion film and the liquid-crystal panel. The prism film is to gather the light that has gone out from the light outgoing face of a light guide and has been diffused in a diffusion film, on the effective display area of a liquid-crystal panel at high efficiency. A liquid-crystal display device with an ordinary direct backlight mounted thereon comprises, for example, a color filter sandwiched between a transparent substrate and a polarizer and a liquid-crystal panel having a liquid-crystal layer in the upper part thereof, and comprises a backlight below them. One typical example of the device of the type is Brightness Enhancement Film (BEF), a registered trade name by US 3M. BEF is a film on which unit prisms each having a triangular cross section are periodically aligned in one direction, in which the prisms have a larger size (pitch) than the wavelength of light. BEF gathers off-axis light, and redirect or recycle it to on-axis light toward viewers. Many patent references such as JP-B 1-37801, JP-A 6-102506 and JP-T 10-506500 are known, which disclose use of a brightness enhancement member having a recurring array structure of prisms such as typically BEF in displays.

For enhancing the light-gathering capability, use of a lens array sheet is also desirable. The lens array sheet has a lens face in which plural unit convex lenses are aligned two-dimensionally at a predetermined pitch. Preferred is a lens array sheet in which the other side opposite to the lens face is a flat face, and on the flat face, a light reflection layer to reflect the incident light in the non-light-gathering region of the lens is formed. Also preferred is a lens array sheet having a lenticular lens face with plural convex cylindrical lenses are aligned in parallel to each other at a predetermined pitch, and a flat face opposite to the lens face, wherein, on the flat face, a light reflection layer is formed that reflects the stripe-like incident light in the lengthwise direction in the non-light-gathering region of the convex cylindrical lenses. Also usable are, for example, a lenticular lens array sheet having in the face thereof unit lenses each composed of a cylindrical curved face as aligned in one direction, and a lens array sheet having in the face thereof unit lenses each composed of a circular, rectangular or hexagonal bottom and a dome-like curved face as aligned two-dimensionally. These lens array sheets are described in JP-A 10-241434, 2001-201611, 2007-256575, 2006-106197, 2006-208930, 2007-213035 and 2007-41172, of which the contents are incorporated herein by reference.

The present invention is effective also in an embodiment of a display in which the color reproduction region is broadened by controlling the emission spectrum from the backlight and the transmission spectrum through the color filter. Concretely, a white backlight is preferably used, comprising a color mixing combination of a red LED, a green LED and a blue LED. Also preferably, the half-value width of the emission peak from the red LED, the green LED and the blue LED is small. Regarding LED, the half-value wavelength width thereof is 20 nm or so and is small as compared with that of CCFL, and the white purity of the light source itself may be increased by controlling the peak wavelength of R (red) to at least 610 nm, that of G (green) to 530 nm and that of B (blue) to at most 480 nm.

It is reported that, outside the peak wavelength of LED, the spectral transmission of the color filter is controlled to be as small as possible whereby the color reproducibility is further enhanced, and the NTSC ratio is specifically 100%. For example, it is described in JP-A 2004-78102. The red color filter preferably has a low transmission at the peak position of the green LED and the blue LED; the green color filer preferably has a low transmission at the peak position of the blue LED and the red LED; and the blue color filter preferably has a low transmission at the peak position of the red LED and the green LED. Concretely, the transmission is at most 0.1 in every case, more preferably at most 0.03, even more preferably at most 0.01. The relationship between the backlight and the color filter is described, for example, in JP-A 2009-192661, the content of which may be incorporated herein by reference.

Use of a laser light source for the backlight is also preferred for broadening the color reproduction region. Preferably, the peak wavelength of the red, green and blue laser light sources are from 430 to 480 nm, from 520 to 550 nm, and from 620 to 660 nm, respectively. The backlight of laser light sources is described in JP-A 2009-14892, the content of which may be incorporated herein by reference.

Hereinafter, various members to be used in the VA-mode liquid crystal display device of the invention will be described in detail.

1. First Retardation Region

According to the invention, the first retardation region containing one layer or two or more layers, which are disposed between the rear-side polarizing element and the VA-type liquid crystal cell, satisfies the following relations:

$0\ nm \leq Re(590) \leq 10\ nm$, and $|Rth(590)| \leq 25\ nm$.

Preferably, the first retardation region satisfies the following relations:

$0\ nm \leq Re(590) \leq 5\ nm$ and $|Rth(590)| \leq 10\ nm$;

More preferably, the first retardation region satisfies the following relations:

$0\ nm \leq Re(590) \leq 3\ nm$ and $|Rth(590)| 5\ nm$.

Retardation in plane of the first retardation region preferably exhibits a higher value at a longer wavelength, that is, the reversed-dispersion characteristics. That is, satisfying $Re(450)<Re(550)<(Re(590)<)Re(650)$ is preferable. This is because, using the first retardation region in which Re exhibits the reversed wavelength dispersion characteristics, the optical properties may be optimized in all of visible-light wavelength region if the optical properties are optimized at the center wavelength of the visible light, about 550 nm. Ideally, the value of $Re(\lambda)$ divided by the wavelength, $\lambda$, of the first retardation region is constant; and according to such an embodiment, the transitions on the Poincare sphere may be same without dependency on the wavelength within the visible-light region, and any color-shift problem in any oblique direction may be resolved.

For achieving further higher front CR, the retardation film(s), disposed at the rear-side, constituting the first retardation region, preferably has haze of equal to or smaller than 0.5, equal to or smaller than 0.3, and equal to or smaller than 0.2.

In the description, the method for measuring haze of a film is as follows. A film sample, 40 mm×80 mm, is prepared, and haze of the sample is measured using a haze-meter (NDH-2000, NIPPON DENSHOKU INDUSTRIES CO., LTD.) under a condition of 25 degrees Celsius and 60% RH according to JIS K-6714.

The first retardation region may be formed of one retardation film or plural retardation films. The materials thereof are especially not limited. Examples of the film satisfying the above-described properties include cellulose acylate-based films and acryl-based polymer films.

Cellulose Acylate-Cased Film:

In the description, the term "cellulose acylate-based film" means a film containing any cellulose acylate(s) as a major ingredient (50 mass % or more with respect to the total mass of all ingredients). The cellulose acylate(s) which can be used for preparing the film is a compound in which hydrogen atom(s) of hydroxy group in the cellulose acylate is substituted with an acyl group. The cellulose acylate is a compound in which hydrogen atom(s) of hydroxy group in the cellulose acylate is substituted with an acyl group; and the acyl group having from 2 (acetyl) to 22 carbon atoms may be used as the substituent. Regarding the cellulose acylate which can be used in the invention, the substitution degree of hydroxy group in cellulose is especially not limited. The degree of substitution (degree of acylation) can be obtained by measuring the binding degree of acetic acid and/or $C_3$-$C_{22}$ aliphatic acid to hydroxy(s) in cellulose and then calculating the measured values(s). The measuring may be carried out according to ASTM Ⓓ D-817-91.

Examples of the cellulose acylate which can be used as a material of the retardation film(s) constituting the first retardation region include the cellulose acylates described in JP-A 2006-184640, [0019]~[0025].

The substitution degree of the cellulose acylate which can be used as a material of the retardation film(s) constituting the first retardation region is especially not limited, and is preferably from 2.30 to 3.00. In terms of preparing a low-haze retardation film, the low acyl-substitution degree is preferable, and the acyl-substitution degree is preferably from 2.30 to 2.65, more preferably from 2.35 to 2.60, and much more preferably from 2.40 to 2.60. On the other hand, in terms of preparing a reversed-wavelength dispersion film, the high acyl-substitution degree is preferable, and the acyl-substitution degree is preferably from 2.65 to 3.00, more preferably from 2.75 to 3.00, and much more preferably from 2.80 to 3.00.

When the acyl substituents of the cellulose acylate are substantially at least two selected from acetyl, propionyl and butanoyl, optical anisotropy of the cellulose acylate film is lowered effectively by using cellulose acylate(s) having the total substituent-degree of from 2.30 to 3.00. The acyl-substitution degree is more preferably from 2.35 to 3.00, and much more preferably from 2.40 to 3.00.

The polymerization degree of the cellulose acylate to be used for preparing the retardation film constituting the first retardation region is, regarding the viscosity-averaged molecular weight, generally from 180 to 700, preferably from 180 to 550, more preferably from 180 to 440, much more preferably from 180 to 400, and even much more preferably from 180 to 350. If the polymerization degree is too high, it is difficult to prepare the film according to a solution casting method due to high viscosity of the cellulose acylate dope. If the polymerization degree is too low, the strength of the film is lowered. The averaged molecular weight can be measured by a limiting-viscosity method proposed by Uda et al. (described in Journal of Society of Fiber Science and Technology, vol. 18, number 1, p. 105-120, 1962, Uda Kazuo, Satou Hideo). The method is described in detail in JP-A 9-95538.

The molecular-weight distribution of the cellulose acylate to be used for preparing the retardation film constituting the first retardation region may be evaluated according to a gel-permeation chromatography; and the polydispersity index number, Mw/Mn (Mw means mass-averaged molecular weight; and Mn means number-averaged molecular weight) is preferably small, that is, the molecular-weight distribution is preferably narrow. More specifically, the value of Mw/Mn is preferably from 1.0 to 3.0, more preferably from 1.0 to 2.0 and most preferably from 1.0 to 1.6.

For preparing the film satisfying the optical properties, which the first retardation region is required to have, by itself or in combination with other film(s), any additive(s) may be used with the cellulose acylate. Examples of the additive which can be used include agents for controlling wavelength-dispersion, UV inhibitors, plasticizers, degradation inhibitors, fine particles and agents for controlling optical properties. Examples of the additive which can be used in the invention include those described in JP-A 2006-184640, [0026]-[0218]. The preferred range of the additive is as same as that described in the publication.

The compound for lowering optical anisotropy may have any aryl group or may have no aryl group. The molecular weight of the compound for lowering optical anisotropy is preferably from 150 to 3000, more preferably from 170 to 2000, and especially preferably from 200 to 1000. Any monomers and any oligomers and polymers containing plural monomers, having the molecular weight falling within the above-described range, may be used.

Preferably, the compound for lowering optical anisotropy is liquid at 25 degrees Celsius, or solid having a melting point from 25 to 250 degrees Celsius; more preferably, the compound for lowering optical anisotropy is liquid at 25 degrees Celsius, or solid having a melting point from 25 to 200 degrees Celsius. And preferably the compound for lowering optical anisotropy is hardly evaporated during the step of casting or drying the dope.

The amount of the compound for lowering optical anisotropy is preferably from 0.01 to 30% by mass, more preferably from 1 to 25% by mass, especially preferably from 5 to 20% by mass with respect to the solid content of the cellulose acylate. Especially, according to the invention, at least one compound for lowering optical anisotropy is preferably added to the cellulose acylate having the degree of acyl-substitution of from 2.85 to 3.00 in the amount falling within the above-described range.

The compound for lowering optical anisotropy may be used alone or in combination with other(s) in any ratio. According to a solution casting method, the compound for lowering optical anisotropy may be added to a dope in any step during preparing the dope, and may be added to the dope in the final stage.

The cellulose acylate-base film to be used as a part of the first retardation region or as the first retardation region itself is preferably prepared according to a solution casting method. In this method, a solution (dope) which is prepared by dissolving cellulose acylate in an organic solvent is used for forming the film. When at least one additive is used, the additive may be added to a dope in any step during preparing the dope. Regarding the method for preparing the cellulose acylate-base films which can be used in the invention, the description in JP-A 2006-184640, [0219]-[0224] can be referred to.

As a solvent cast method, solution lamination-casting method such as co-solvent cast method, solution successive-casting method and coating method may be used. Using a co-solvent cast method or successive-solvent method, plural cellulose acylate solutions (dopes) for forming the layers respectively are prepared. According to a solution co-casting method (simultaneous multilayered casting), each dope for each layer of plural layers (for example three or more layers) is extruded simultaneously from each slit on a casting-support (such as band or drum) by using a geeser for casting, then peeled off from the support at an appropriate time, and then dried to form a film.

According to a solution successive-casting method, at first, a dope of the first layer is extruded from a geeser for casting to be cast on a support; and, after being dried or not being dried, then a dope for the second layer is extruded from the geeser for casting to be cast on the first layer. And if necessary, the three or more dopes are successively cast and laminated in this manner, then removed from the support at the appropriate time, and dried to form a film.

According to a coating method, generally, a core layer is prepared according to a solution casting method. And then, a prepared coating liquid is applied to the surfaces of the core layer respectively or simultaneously by using an appropriate apparatus and dried to form a layered film.

Acryl-based Polymer Film:

The acryl-based polymer film which can be used in the invention is a film containing an acryl-based polymer having at least one repeating unit of (meth)acrylic acid ester as a major ingredient. Preferable examples of the acryl-based polymer include acryl-based polymers having at least one unit selected from the group consisting of lactone ring unit, maleic acid anhydride unit and glutaric anhydride together with at least one repeating unit of (meth)acrylic acid ester. Such acryl-based polymers are described in detail in JP-A 2008-9378, to which can be referred.

Various methods may be used for producing the film. For example, a solution casting method, melt-extrusion method, calendar method or condensing forming method may be used. Among these, a solution casting method and melt-extrusion method are preferable.

Examples of the solvent to be used in the solution casting method include chlorine-based solvents such as chloroform and dichloromethane; aromatic-based solvents such as toluene, xylene and benzene; alcohol-based solvents such as methanol, ethanol, isopropanol, n-butanol and 2-butanol; methylcellosolve, ethylcellosolve, butylcellosolve, butylcellosolve, dimethylformamide, dimethylsulfoxide, dioxane, cyclohexanone, tetrahydrofuran, acetone, methylethylketone, ethylacetate and diethylether. These solvents may be used alone or in combination with other(s).

The apparatus to be used in the solution casting method includes a drum-type casting machine, band-type casting machine and spin-coater.

As a melt-extrusion method, a T-die method and inflation method are exemplified. The temperature of the film forming is preferably from 150 to 350 degrees Celsius, and more preferably from 200 to 300 degrees Celsius.

The thickness of the retardation film disposed at the rear-side, constituting the first retardation region is preferably small. However, for reducing unevenness at the corner-side, it is necessary to reduce the deformation of the retardation film caused by external force to be applied to the film. The thickness of the retardation film disposed at the rear-side, constituting the first retardation region is preferably equal to or more than 20 micro meters and equal to or less than 200 micro meters, in terms of reducing unevenness at the corner-side and improving the productivity.

2. Second Retardation Region

The optical properties of the second retardation region, which is disposed between the front-side polarizing element and the liquid crystal cell, are preferably controlled to contribute to improving the contrast ratio in the oblique direction and reducing the color shift in the black state. One examples of the preferable second retardation region satisfies the following relations:

30 nm≦Re(590)≦90 nm and 170 nm≦Rth(590)≦300 nm.

By using the second retardation region having the properties falling within the range, it is possible to reduce light leakages in oblique directions in the black state of a VA-mode liquid crystal cell (of which Δnd(590) is from about 180 to about 350 nm).

Furthermore, the preferable range of retardation, especially Rth, of the second retardation region may vary depending on the value of Δnd(λ) of the liquid crystal layer. Using $Rth_1(\lambda)$, which is Rth of the first retardation region at a wavelength λ, $Rth_2(\lambda)$, which is Rth of the second retardation region at a wavelength λ, and Δnd(λ) of the liquid crystal layer, one preferable example of the second retardation region satisfies the following relation.

Δnd(590)−70≦$Rth_1$(590)+$Rth_2$(590)≦Δnd(590)−10

One more preferable example of the second retardation region satisfies the following relation.

Δnd(590)−60≦$Rth_1$(590)+$Rth_2$(590)≦Δnd(590)−20

By using the second retardation region having the properties falling within the range, it is possible to more reduce light leakages in oblique directions in the black state of a VA-mode liquid crystal cell.

As described above, for improving the transmittance in the white state, that is, improving the normal CR, Δnd(590) of the liquid crystal layer is preferably equal to or more than 280 nm and equal to or less than 340 nm. In the embodiment, the second retardation region disposed at the front-side preferably satisfies the following relation:

220 nm≦Rth(590)≦280 nm; and more preferably satisfies the following relation:

230 nm≦Rth(590)≦280 nm.

On the other hand, considering the productivity, the embodiment employing a retardation film satisfying Rth (590)≦230 nm as the second retardation region may be preferable. Usually, for preparing a retardation film exhibiting high retardation, it is necessary to carry out a stretching treatment with a high stretching ratio, or to increase the amount of the additive capable of contributing to developing retardation. However, increasing the stretching ratio may make the film break more often, or increasing the amount of such an additive may make the additive exude from the film.

For using the retardation film satisfying Rth(590)≦230 nm as the second retardation region, Δnd(590) of the liquid crystal cell preferably satisfies Δnd(590)≦290 nm, and more preferably satisfies Δnd(590)≦280 nm.

The second retardation region may be formed of a retardation film alone or formed of a lamination of two or more films. And the materials thereof are not limited as far as it satisfies the above-described properties. For example, one or two or polymers may be selected from the group consisting of a cellulose acylate, a polycarbonate-based polymer, a polyester-based polymer such as polyethylene terephthalate or polyethylene naphthalate, an acrylic-based polymer such as polymethylmethacrylate, or a styrene-based polymer such as polystyrene or an acrylonitrile-styrene copolymer (AS resin) may be used. Polyolefin such as polyethylene or polypropylene, a polyolefin-based polymer such as an ethylene-propylene copolymer, a vinyl chloride-based polymer, an amide-based polymer such as nylon or aromatic polyamide, an imido-based polymer, a sulfone-based polymer, a polyether sulfone-based polymer, polyetherether ketone-based polymer, a polyphenylensulfide-based polymer, a vinylidene chloride-based polymer, a vinyl alcohol-based polymer, a vinyl butyral-based polymer, an acrylate-based polymer, a polyoxymethylene-based polymer, an epoxy-based polymer, and a polymer containing a mixture of the above polymers, and are used as a major ingredient for preparing the retardation film constituting the second retardation region satisfying the above-described properties.

A cellulose acylate-based film is preferably used as a retardation film constituting the second retardation region. The cellulose acylate, which can be used as a material of the retardation film constituting the second retardation region, preferably has the degree of acyl-substitution of from 2.00 to 3.00. Generally, retardation of a film is adjusted to a preferable value by being subjected to a stretching treatment. In terms of developing retardation via a stretching treatment, the degree of acyl-substitution is preferably low. However, an un-stretched film having a lower degree of acyl-substitution exhibits higher Rth; and as a retardation film to be used in a VA-mode liquid crystal display device, the cellulose acylate preferably has the degree of acyl-substitution of from 2.00 to 2.65, more preferably from 2.20 to 2.65, and much more preferably from 2.30 to 2.60. On the other hand, in terms of preparing a reversed-wavelength dispersion film, the high acyl-substitution degree is preferable, and the acyl-substitution degree is preferably from 2.65 to 3.00, more preferably from 2.75 to 3.00, and much more preferably from 2.80 to 3.00.

The cellulose acylate is preferably cellulose acetate. However, the cellulose acylate may be substituted with an acyl other than acetyl together with acetyl or in place of acetyl. Cellulose acylates having at least one selected from the group consisting of acetyl, propionyl and butyryl are preferable; and cellulose acylates having at least two selected from the group consisting of acetyl, propionyl and butyryl are more preferable. Furthermore, cellulose acylates having acetyl and propionyl and/or butyryl are preferable; and cellulose acylates having the degree of acetyl-substitution of from 1.0 to 2.97 and the degree of propionyl- and/or butyryl-substitution of from 0.2 to 2.5 are more preferable.

The cellulose acylate has preferably a mass average degree of polymerization of 200 to 800, and more preferably a mass average degree of polymerization of 250 to 550. The cellulose acylate used in the present invention has preferably an average molecular weight of 70000 to 230000, more preferably 75000 to 230000, and still more preferably 78000 to 120000.

The cellulose acylate which can be used as a material of the retardation film constituting the second retardation region is same as the cellulose acylate which can be used as a material of the retardation film constituting the first retardation region; however, the additive such as the compound for lowering optical anisotropy which can be used as a material of the retardation film constituting the first retardation region is preferably not used in preparing the cellulose acylate-based film constituting the second retardation region. On the other hand, for preparing the cellulose acylate-based film constituting the second retardation region, retardation enhancer is preferably used as an additive. Examples of the retardation enhancer which can be used in the invention include rod-like or discotic compounds and positive-birefringence compounds. Examples of the rod-like or discotic compound include compounds having at least two aromatic rings, and are preferably used as a retardation enhancer. The amount of the rod-like compound is preferably from 0.1 to 30 parts by mass, and more preferably from 0.5 to 20 parts by mass with respect to 100 parts by mass of the polymer ingredients including cellulose acylate. The amount of the discotic compound is preferably from 0.05 to 20 parts by mass, more preferably from 0.1 to 15 parts by mass, and much more preferably from 0.1 to 10 parts by mass with respect to 100 parts by mass of the cellulose acylate.

The discotic compound is more excellent than the rod-like compound in terms of enhancing Rth retardation; and when especially high Rth retardation is required, the discotic compound is preferably used. Plural types of the compounds may be used as a retardation enhancer.

The retardation enhancer preferably has a maximum absorption within the wavelength range of from 250 to 400 nm, and preferably has no absorption within the visible-light range substantially.

(1) Discotic Compound

The discotic compound is described in detail. As the discotic compound, compounds having at least two aromatic rings may be used.

In the description, the term "aromatic ring" means not only an aromatic hydrocarbon ring but also an aromatic hetero ring. Examples of the discotic compound which can be used in the invention include those described in JP-A 2008-181105, [0038]-[40046].

Examples of the discotic compound which can be used as a material of the retardation film constituting the second retardation region include the compounds represented by formula (I) below.

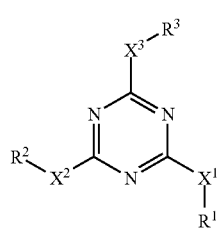

(I)

In the formula, $X^1$ represents a single bond, —$NR^4$—, —O— or —S—; $X^2$ represents a single bond, —$NR^5$—, —O— or —S—; $X^3$ represents a single bond, —$NR^6$—, —O— or —S—. And, $R^1$, $R^2$, and $R^3$ independently represent an alkyl group, an alkenyl group, an aromatic ring group or a hetero-ring residue; $R^4$, $R^5$ and $R^6$ independently represent a hydrogen atom, an alkyl group, an alkenyl group, an aryl group or a hetero-ring group.

Preferred examples, I-(1) to IV-(10), of the compound represented by formula (I) include, but are not limited to, those shown below.

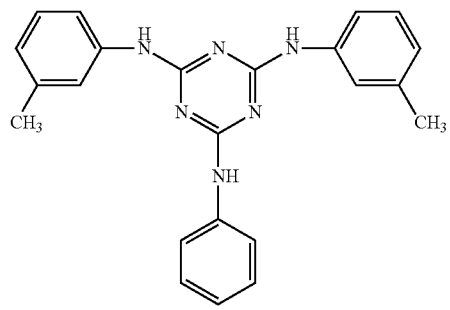

I-(1)

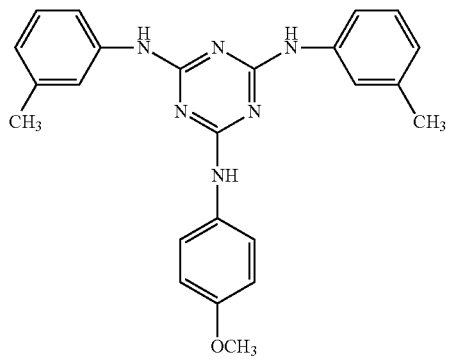

I-(2)

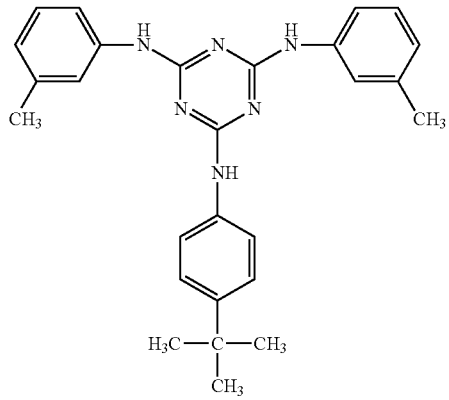

I-(3)

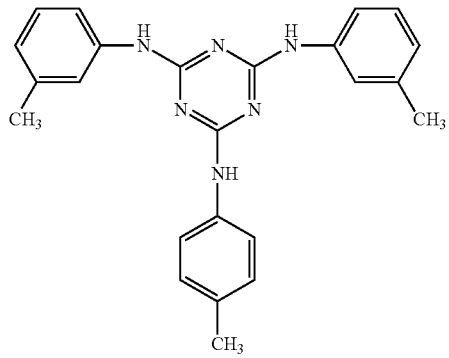

I-(4)

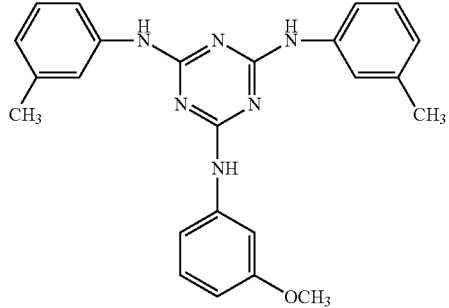

I-(5)

-continued
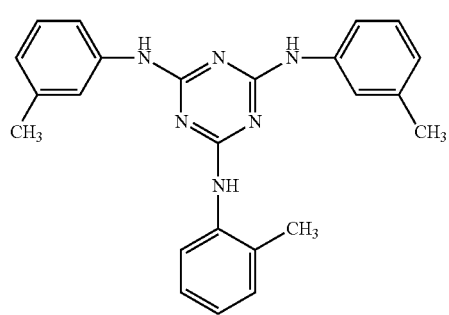
I-(6)
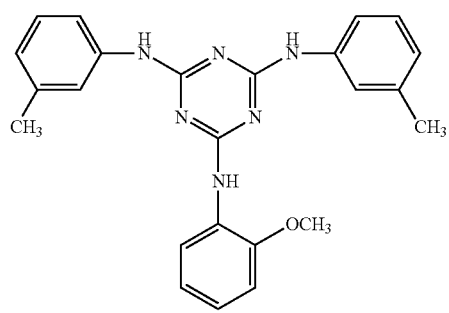
I-(7)
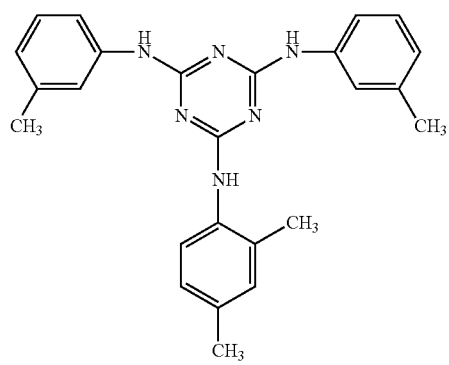
I-(8)
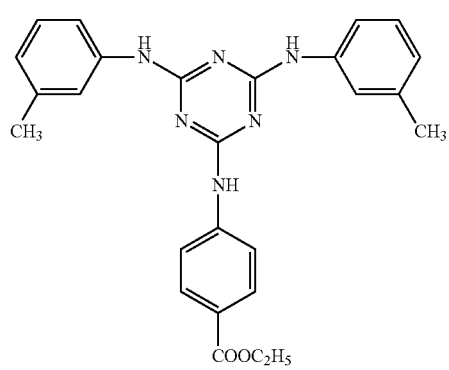
I-(9)
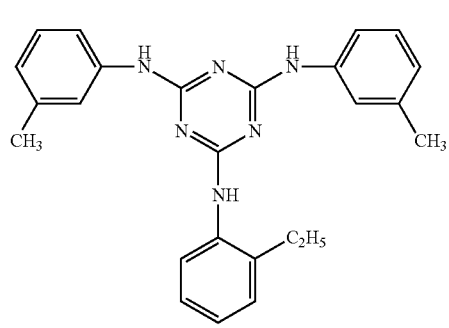
I-(10)
-continued
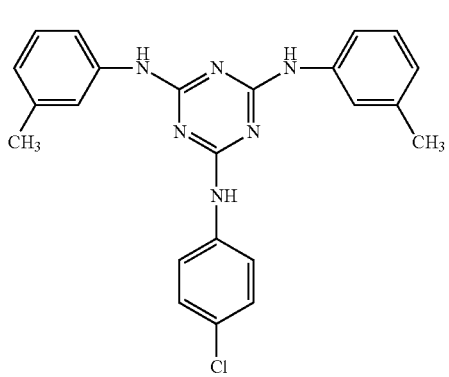
I-(11)
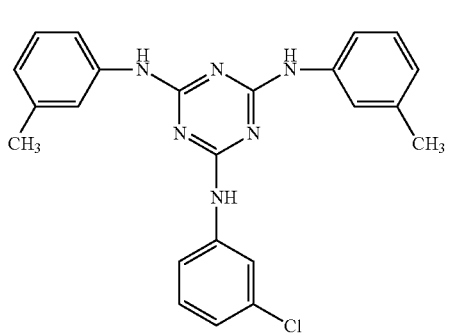
I-(12)
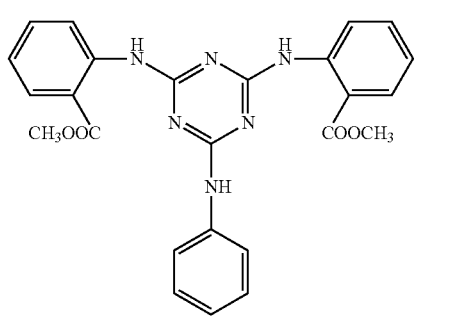
I-(13)
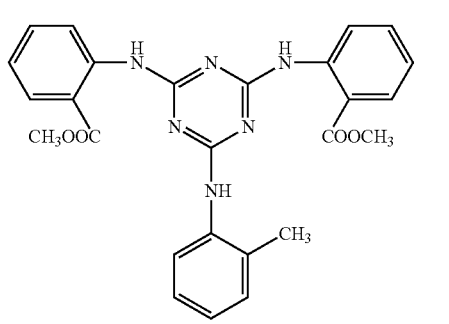
I-(14)
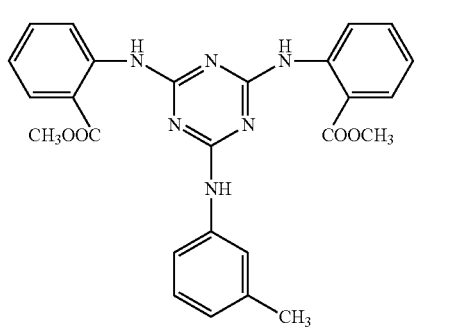
I-(15)

I-(16) 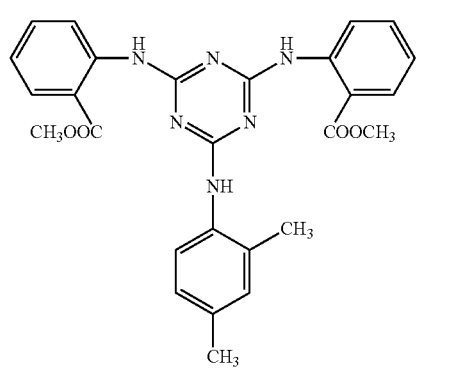
I-(17) 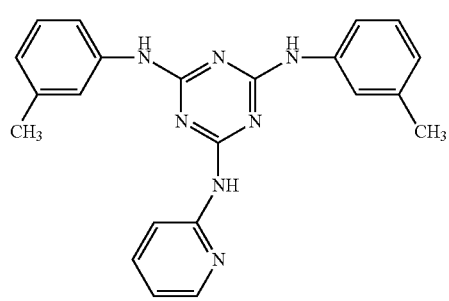
I-(18) 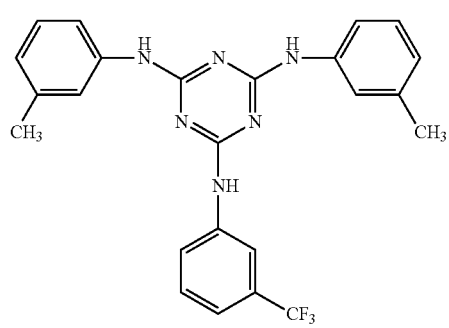
I-(19) 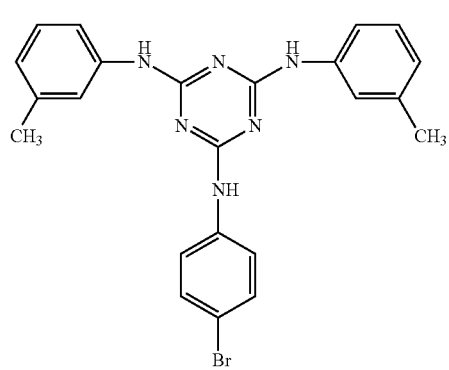
I-(20) 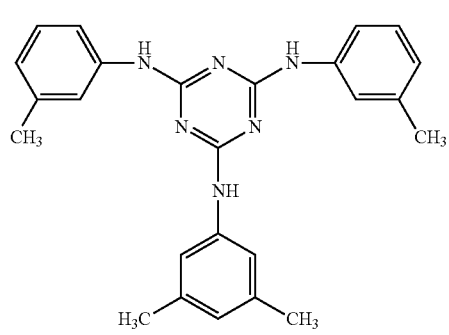
I-(21) 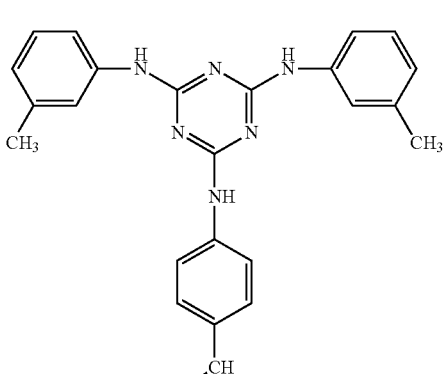
I-(22) 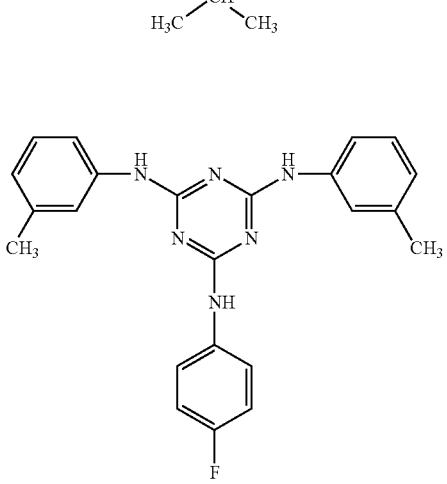
I-(23) 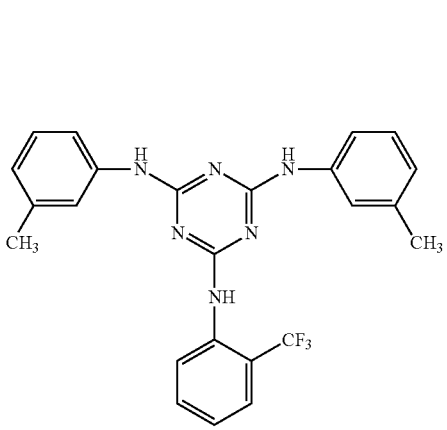
I-(24) 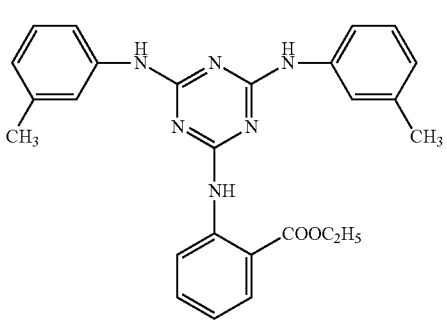

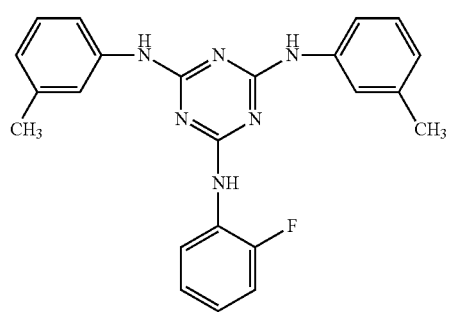
I-(25)
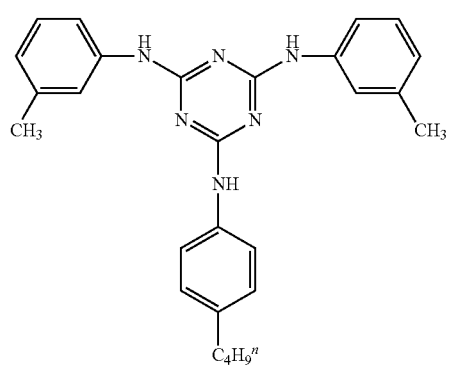
I-(26)
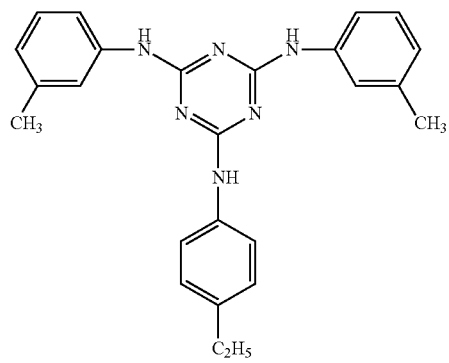
I-(27)
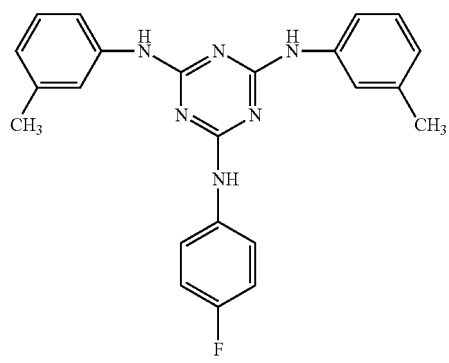
I-(28)
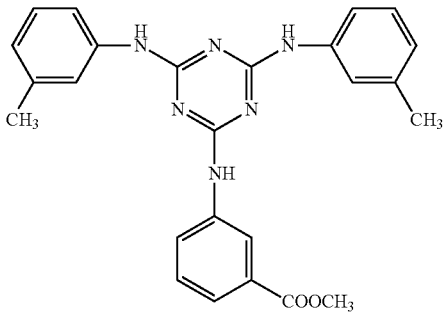
I-(29)
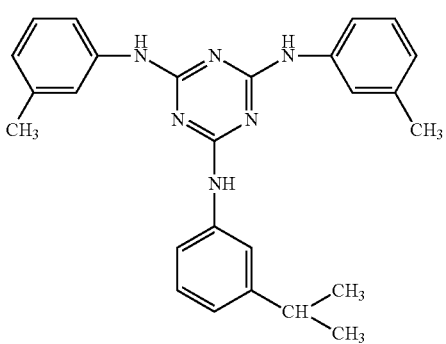
I-(30)
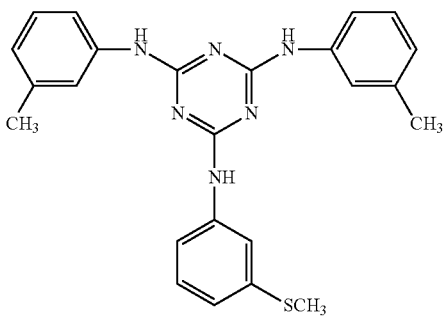
I-(31)
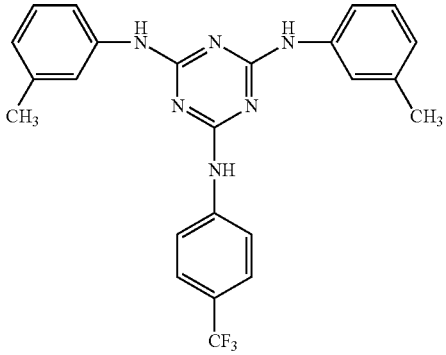
I-(32)
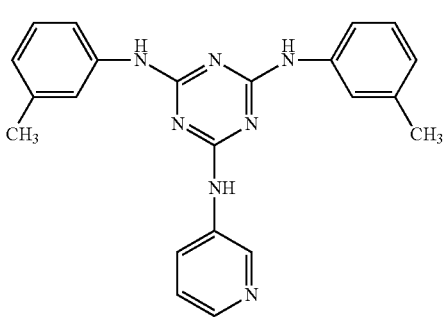
I-(33)

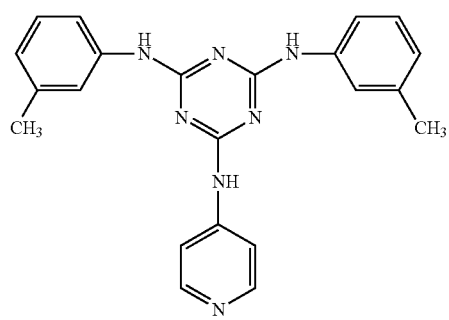
I-(34)
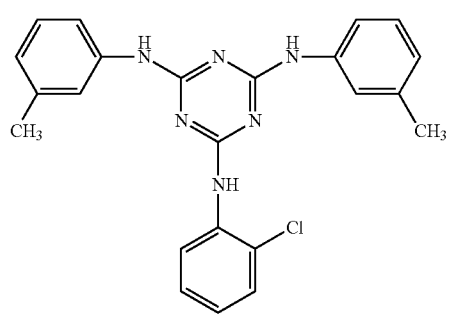
I-(35)
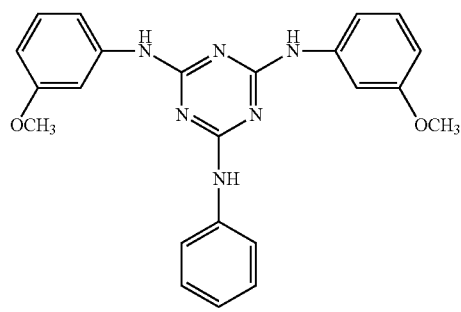
I-(36)
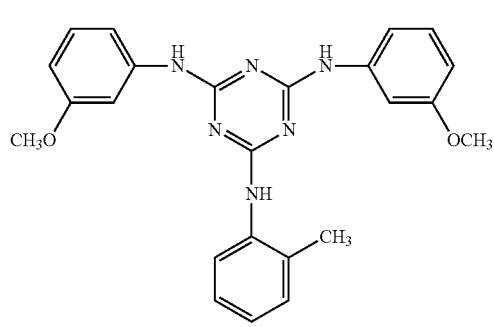
I-(37)
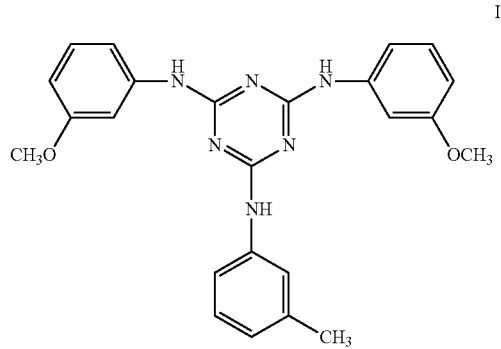
I-(38)
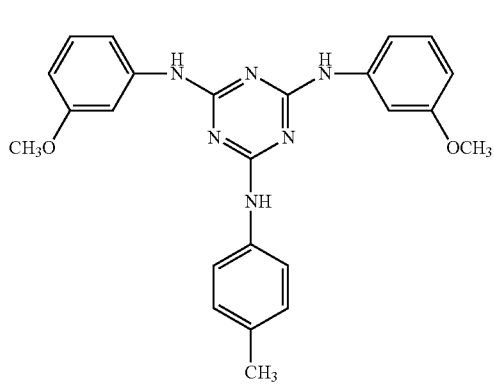
I-(39)
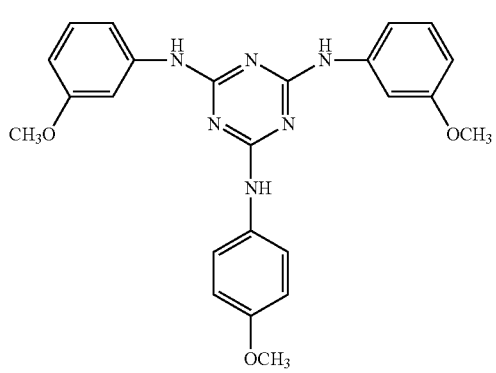
I-(40)
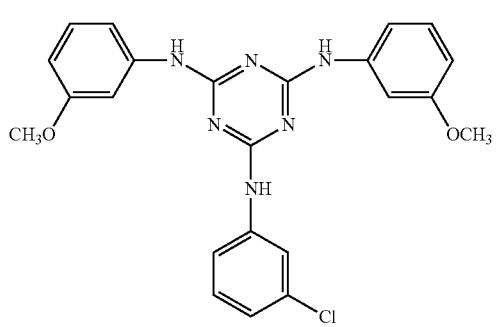
I-(41)
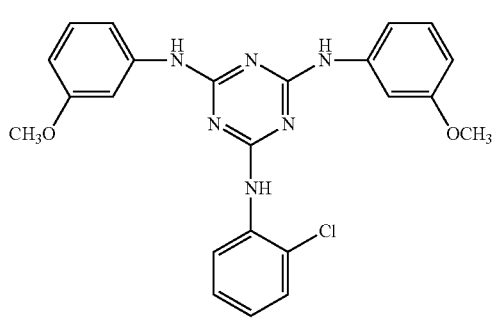
I-(42)

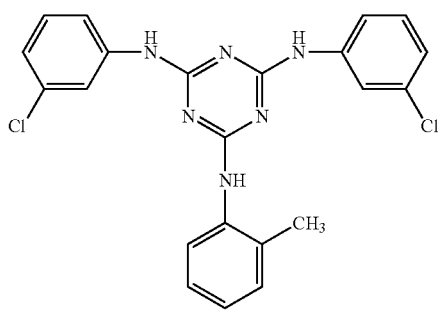
I-(43)
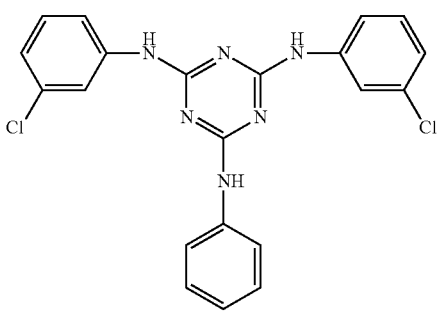
I-(47)
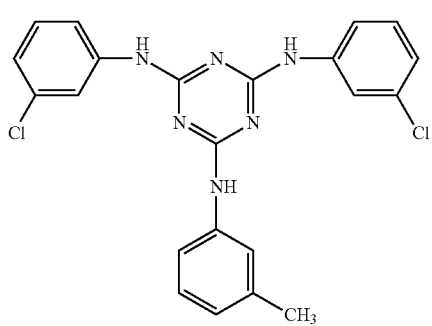
I-(44)
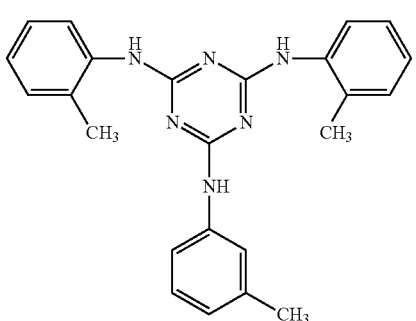
I-(48)
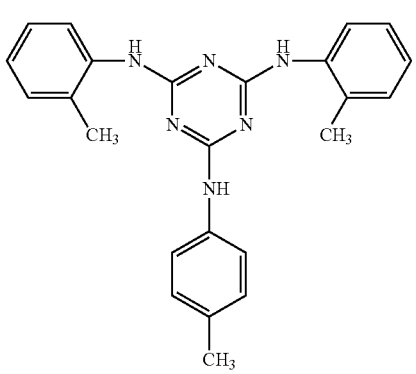
I-(49)
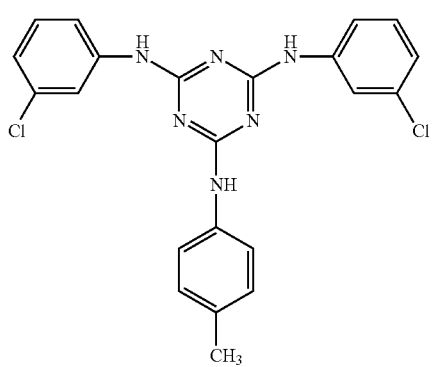
I-(45)
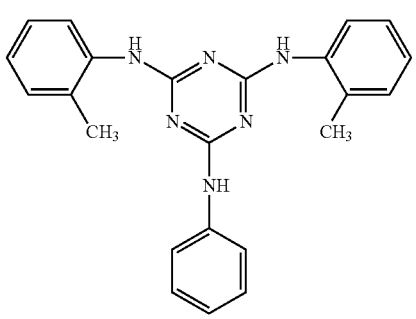
I-(50)
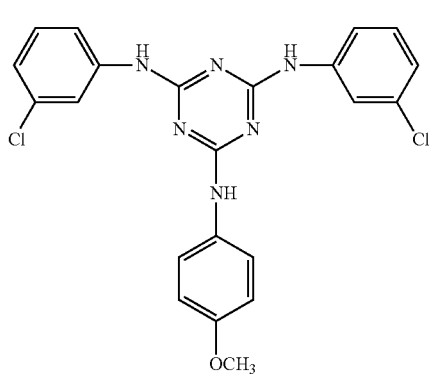
I-(46)
II-(1)

II-(2)
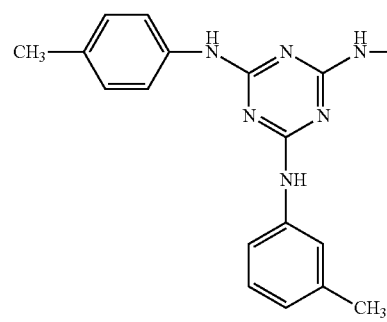
II-(3)
II-(4)
II-(5)
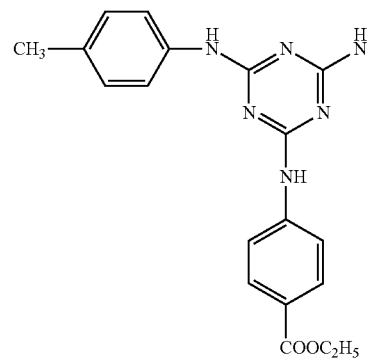
II-(6)
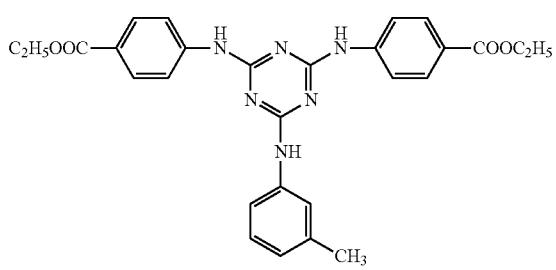
II-(7)
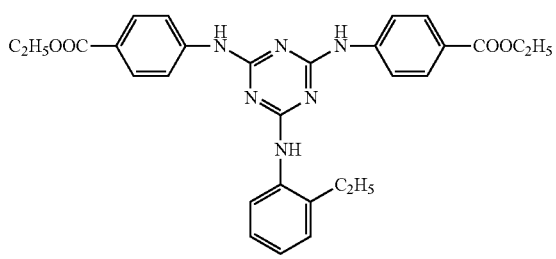
II-(8)
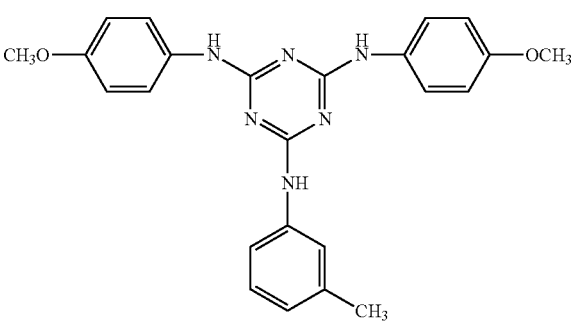
II-(9)
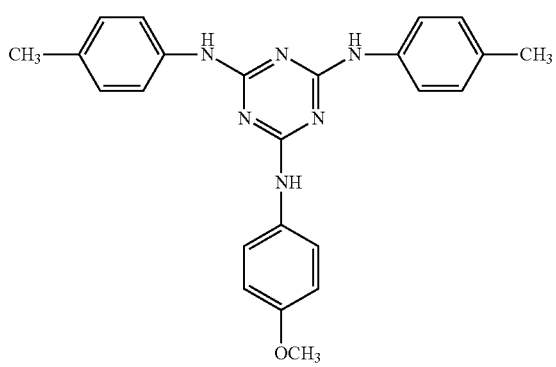
III-(1)
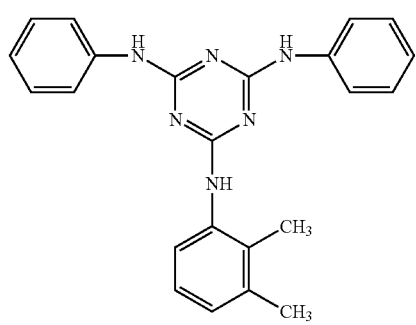

III-(2)
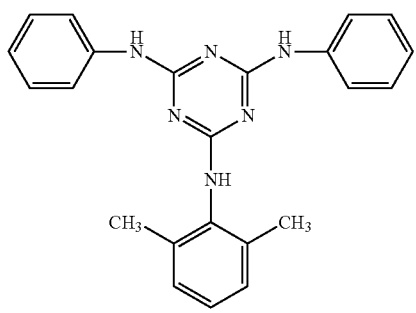
III-(3)
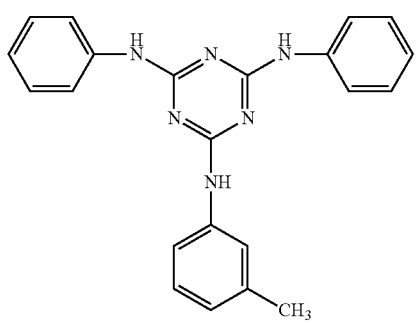
III-(4)
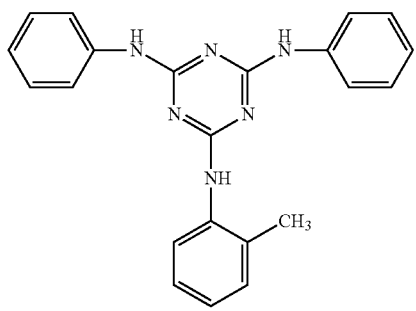
III-(5)
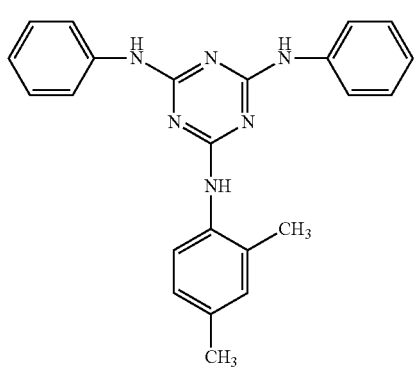
III-(6)
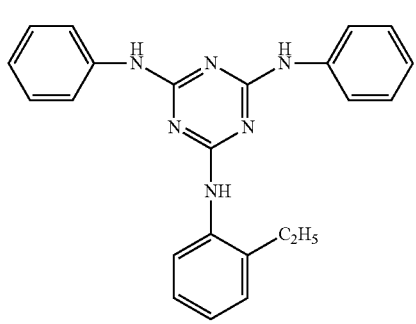
III-(7)
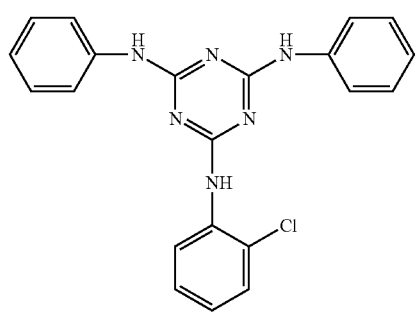
III-(8)
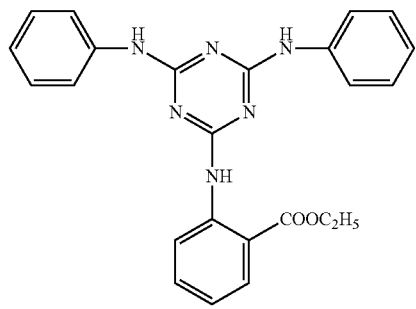
III-(9)
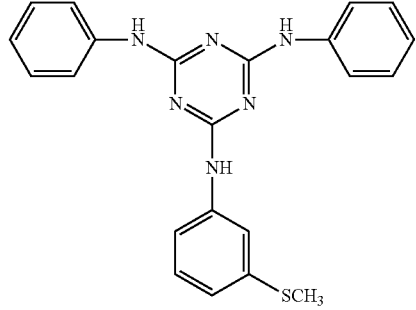
III-(10)
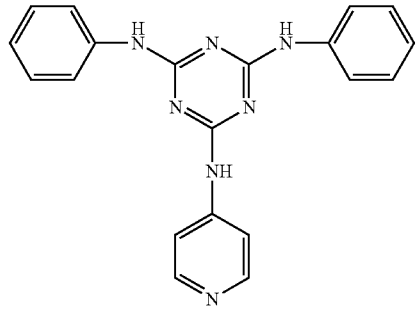
III-(11)
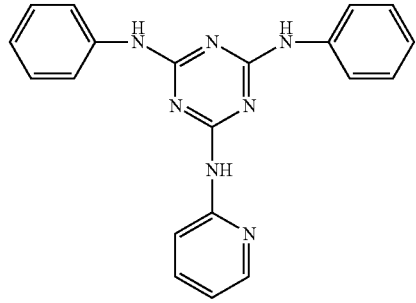

III-(12)
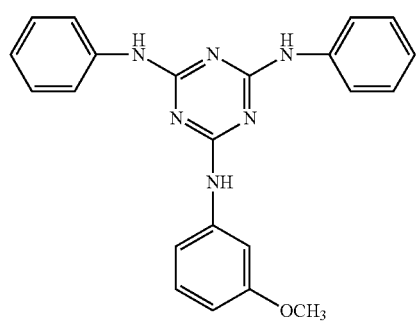
IV-(1)
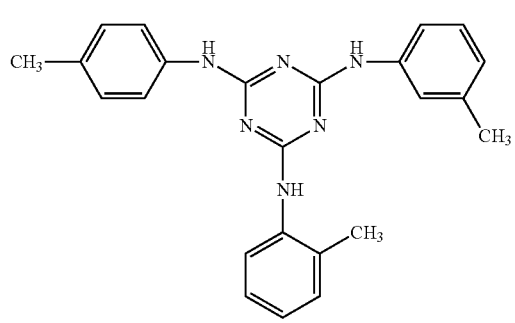
IV-(2)
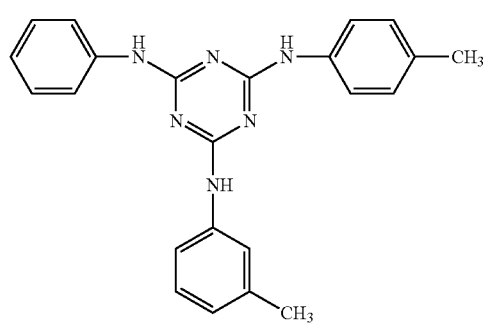
IV-(3)
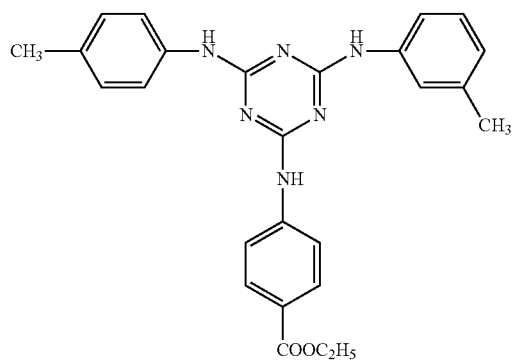
IV-(4)
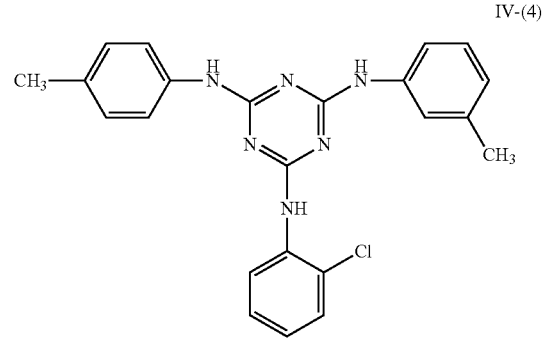
IV-(5)
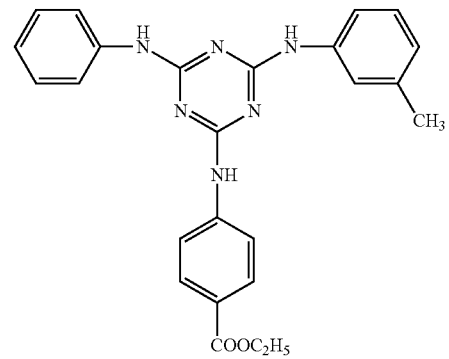
IV-(6)
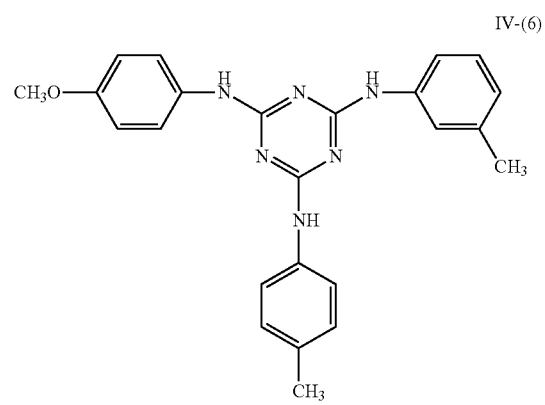
IV-(7)
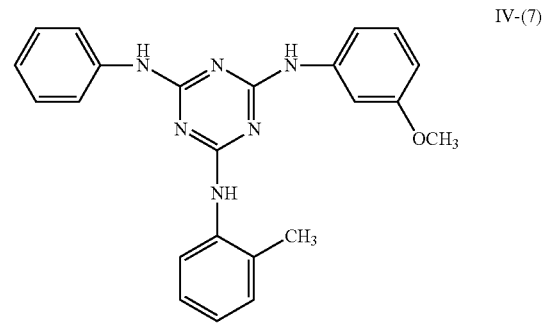

-continued

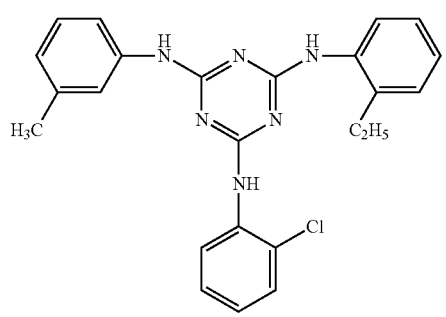
IV-(8)

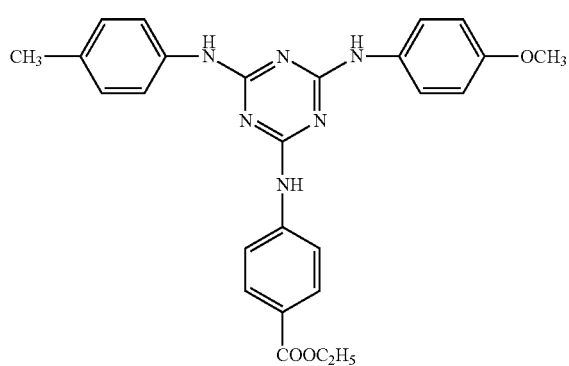
IV-(9)

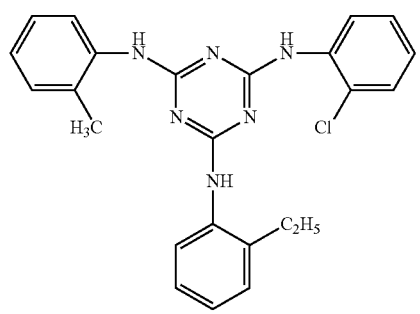
IV-(10)

(2) Rod-Like Compound

In the invention, the rod-like compound, that is, the compound having a straight line-like molecular structure is preferably used other than the discotic compound. Examples of the rod-like compound which can be used in the invention include those described in JP-A2007-268898, [0053]-[0095].

(3) Positive-Birefringent Compound

A positive-birefringent compound is a polymer as follows: a layer formed of monoaxially oriented molecules of a polymer exhibits a larger refractive index relative to the light coming along the orientation direction and a smaller refractive index relative to the light coming along the perpendicular direction to the orientation direction, and in such a case, the polymer is a positive-birefringent polymer.

Such a positive-birefringent compound is not limited, and examples of the positive-birefringent compound include polymers having intrinsic positive birefringence such as polyamides, polyimides, polyesters, polyetherletones, polyamideimides and polyesterimides; polyetherketones and polyester-based polymers are preferable; and polyester-based polymers are more preferable.

The polyester-based polymers are prepared by carrying out the reaction of the mixture of $C_{2-20}$ aliphatic dicarboxylic acids and $C_{8-20}$ aromatic dicarboxylic acids with at least one diol selected from $C_{2-12}$ aliphatic diols, $C_{4-20}$ alkylether diols and $C_{6-20}$ aromatic diols. If necessary, the both terminals of the products may be blocked by carrying out the reaction with mono carboxylic acid, mono alcohol or phenol. Blocking the terminal may be carried out for avoiding contamination of any free carboxylic acid, and is preferable in terms of preservation stability. The dicarboxylic acids which can be used for preparing the polyester-based polymers are preferably $C_{4-20}$ aliphatic dicarboxylic acids or $C_{8-20}$ aromatic dicarboxylic acids.

Examples of the preferable $C_{2-20}$ aliphatic dicarboxylic acids which can be used preferable include oxalic acid, malonic acid, succinic acid, maleic acid, fumaric acid, glutaric acid, adipic acid, pimelic acid, suberic acid, azelaic acid, sebacic acid, dodecanedicarboxylic acid and 1,4-cyclohexane dicarboxylic acid.

Examples of $C_{8-20}$ aromatic dicarboxylic acid include phthalic acid, terephthalic acid, isophthalic acid, 1,5-naphtharene dicarboxylic acid, 1,4-naphtharene dicarboxylic acid, 1,8-naphtharene dicarboxylic acid, 2,8-naphtharene dicarboxylic acid and 2,6-naphtharene dicarboxylic acid.

Among these aliphatic dicarboxylic acids, malonic acid, succinic acid, maleic acid, fumaric acid, glutaric acid, adipic acid, azelaic acid and 1,4-cyclohexane dicarboxylic acid are preferable; and among these aromatic dicarboxylic acids, phthalic acid, terephthalic acid, isophthalic acid, 1,5-naphtharene dicarboxylic acid and 1,4-naphtharene dicarboxylic acid are preferable. Among these aliphatic dicarboxylic acids, succinic acid, glutaric acid and adipic acid are especially preferable; and among these aromatic dicarboxylic acids, phthalic acid, terephthalic acid and isophthalic acid are especially preferable.

Any combination of the above-described aliphatic dicarboxylic acid and aromatic dicarboxylic acid may be used, and the combination is not especially limited. Plural types of them may be combined respectively.

The diol or aromatic diol which can be used in the positive birefringent compound may be, for example, selected from $C_{2-20}$ aliphatic diols, $C_{4-20}$ alkylether diols and $C_{6-20}$ aromatic diols Examples of $C_{2-20}$ aliphatic diol include alkyl diols and alicyclic diols such as ethane diol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethyrol pentane), 2-n-butyl-2-ethyl-1,3-propanediol (3,3-dimethyrol heptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, and 1,12-octadecanediol. These glycols may be used alone or in combination with other(s).

Ethane diol, 1,2-propanediol, 1,3-propanediol, 1,2-butanediol, 1,3-butanediol, 2-methyl-1,3-propanediol, 1,4-butanediol, 1,5-pentanediol, 3-methyl-1,5-pentanediol, 1,6-hexanediol, 1,4-cyclohexane diol and 1,4-cyclohexane dimethanol are preferable; and ethane diol, 1,2-propanediol, 1,3-propanediol, 1,2-butanediol, 1,3-butanediol, 1,4-butanediol, 1,5-pentanediol, 1,6-hexanediol, 1,4-cyclohexane diol and 1,4-cyclohexane dimethanol are especially preferable.

Preferable examples of $C_{4-20}$ alkylether diol include polytetramethylene ether glycol, polyethylene ether glycol, polypropylene ether glycol and any combinations thereof. The averaged polymerization degree is especially not limited, and preferably from 2 to 20, more preferably from 2 to 10, much more preferably from 2 to 5 and especially preferably from 2 to 4. Examples of such a compound include useful commercially-available polyether glycols such as Carbowax resins, Pluronics resins and Niax resins.

Examples of $C_{6-20}$ aromatic diol include, however are not limited to, bisphenol A, 1,2-hydroxy benzene, 1,3-hydroxy benzene, 1,4-hydroxy benzene and 1,4-benzene dimethanol. Bisphenol A, 1,4-hydroxy benzene and 1,4-benzene dimethonal are preferable.

The positive birefringent compound is preferably the compound of which terminals are blocked by any alkyl or aryl group. Protecting the terminals with any hydrophobic group is effective for preventing time degradation under a condition of a high temperature and a high humidity, and this is because it may play a role of prolonging hydrolysis of ester groups. For avoiding terminal OH or carboxylic acid in the positive birefringent compound, the terminal is preferably blocked with a monoalcohol residue or a monocarboxylic acid residue.

As the monoalcohol, $C_{1-30}$ substituted or non-substituted monoalcohols are preferable, and examples thereof include aliphatic alcohols such as methanol, ethanol, propanol, isopropanol, butanol, isobutanol, pentanol, isopentanol, hexanol, isohexanol, cyclohexyl alcohol, octanol, isooctanol, 2-ethylhexyl alcohol, nonyl alcohol, isononyl alcohol, tert-nonyl alcohol, decanol, dodecanol, dodeca hexanol, dodeca octanol, allyl alcohol and oleyl alcohol; and substituted alcohols such as benzyl alcohol and 3-phenyl propanol.

Preferable examples of the alcohol which can be used for blocking the terminals include methanol ethanol, propanol, isopropanol, butanol, isobutanol, pentanol, isopentanol, hexanol, isohexanol, cyclohexyl alcohol, isooctanol, 2-ethylhexyl alcohol, isononyl alcohol, oleyl alcohol and benzyl alcohol: and much more preferable examples thereof include methanol ethanol, propanol, isobutanol, cyclohexyl alcohol, 2-ethylhexyl alcohol, isononyl alcohol and benzyl alcohol.

When a monocarboxylic acid residue is used for blocking the terminals, monocarboxylic acid, which is used as a monocarboxylic acid residue, is preferably $C_{1-20}$ substituted or non-substituted monocarboxylic acid. It may be an aliphatic monocarboxylic acid or aromatic monocarboxylic acid. Preferable examples of the aliphatic monocarboxylic acid include acetic acid, propionic acid, butane acid, caprylic acid, caproic acid, decane acid, dodecane acid, stearic acid and oleic acid; and preferable examples of the aromatic monocarboxylic acid include benzoic acid, p-tert-butyl benzoic acid, p-tert-amyl benzoic acid, orthotoluic acid, methatoluic acid, paratoluic acid, dimethyl benzoic acid, ethyl benzoic acid, n-propyl benzoic acid, amino benzoic acid and acetoxy benzoic acid. These compounds may be used alone or in combination with other(s).

The positive birefringent compound can be produced with ease according to any conventional method, for example, according to a polyesterification, interesterification or thermal-fusing condensation method of a dicarboxylic acid component and a diol component and/or a monocarboxylic acid or monoalcohol for blocking terminals, or an interfacial condensation method of an acid chloride of a dicarboxylic acid component and a glycol. Polycondensate esters usable in the invention are described in detail in Koichi Mural, "Plasticizers and their Theory and Applications" (by Miyuki Shobo, 1st Ed., issued on Mar. 1, 1973). In addition, also usable herein are materials described JP-A Nos. 5-155809, 5-155810, 5-197073, 2006-259494, 7-330670, 2006-342227, and 2007-3679.

Examples of the positive birefringent compound include, however are not limited to, those shown below.

TABLE 1

| | Dicarboxylic acid | | | Diol | | |
|---|---|---|---|---|---|---|
| | Aromatic dicarboxylic acid | Aliphatic dicarboxylic acid | Ratio of dicarboxylic acids (mol %) | Aliphatic diol | Both terminals | Number-averaged molecular weight |
| P-1 | — | AA | 100 | Ethane diol | hydroxyl | 1000 |
| P-2 | — | AA | 100 | Ethane diol | hydroxyl | 2000 |
| P-3 | — | AA | 100 | Propane diol | hydroxyl | 2000 |
| P-4 | — | AA | 100 | Butane diol | hydroxyl | 2000 |
| P-5 | — | AA | 100 | Hexane diol | hydroxyl | 2000 |
| P-6 | — | AA/SA | 60/40 | Ethane diol | hydroxyl | 900 |
| P-7 | — | AA/SA | 60/40 | Ethane diol | hydroxyl | 1500 |
| P-8 | — | AA/SA | 60/40 | Ethane diol | hydroxyl | 1800 |
| P-9 | — | SA | 100 | Ethane diol | hydroxyl | 1500 |
| P-10 | — | SA | 100 | Ethane diol | hydroxyl | 2300 |
| P-11 | — | SA | 100 | Ethane diol | hydroxyl | 6000 |
| P-12 | — | SA | 100 | Ethane diol | hydroxyl | 1000 |
| P-13 | PA | SA | 50/50 | Ethane diol | hydroxyl | 1000 |
| P-14 | PA | SA | 50/50 | Ethane diol | hydroxyl | 1800 |
| P-15 | PA | AA | 50/50 | Ethane diol | hydroxyl | 2300 |
| P16 | PA | SA/AA | 40/30/30 | Ethane diol | hydroxyl | 1000 |
| P-17 | PA | SA/AA | 50/20/30 | Ethane diol | hydroxyl | 1500 |
| P-18 | PA | SA/AA | 50/30/20 | Ethane diol | hydroxyl | 2600 |
| P-19 | TPA | SA | 50/50 | Ethane diol | hydroxyl | 1000 |
| P-20 | TPA | SA | 50/50 | Ethane diol | hydroxyl | 1200 |
| P-21 | TPA | AA | 50/50 | Ethane diol | hydroxyl | 2100 |
| P-22 | TPA | SA/AA | 40/30/30 | Ethane diol | hydroxyl | 1000 |
| P-23 | TPA | SA/AA | 50/20/30 | Ethane diol | hydroxyl | 1500 |
| P-24 | TPA | SA/AA | 50/30/20 | Ethane diol | hydroxyl | 2100 |
| P-25 | PA/TPA | AA | 15/35/50 | Ethane diol | hydroxyl | 1000 |
| P-26 | PA/TPA | AA | 20/30/50 | Ethane diol | hydroxyl | 1000 |
| P-27 | PA/TPA | SA/AA | 15/35/20/30 | Ethane diol | hydroxyl | 1000 |
| P-28 | PA/TPA | SA/AA | 20/30/20/30 | Ethane diol | hydroxyl | 1000 |
| P-29 | PA/TPA | SA/AA | 10/50/30/10 | Ethane diol | hydroxyl | 1000 |
| P-30 | PA/TPA | SA/AA | 5/45/30/20 | Ethane diol | hydroxyl | 1000 |
| P-31 | — | AA | 100 | Ethane diol | acetyl ester residue | 1000 |
| P-32 | — | AA | 100 | Ethane diol | acetyl ester residue | 2000 |

TABLE 1-continued

| | Dicarboxylic acid | | | Diol | | |
|---|---|---|---|---|---|---|
| | Aromatic dicarboxylic acid | Aliphatic dicarboxylic acid | Ratio of dicarboxylic acids (mol %) | Aliphatic diol | Both terminals | Number-averaged molecular weight |
| P-33 | — | AA | 100 | Propane diol | acetyl ester residue | 2000 |
| P-34 | — | AA | 100 | Butane diol | acetyl ester residue | 2000 |
| P-35 | — | AA | 100 | Hexane diol | acetyl ester residue | 2000 |
| P-36 | — | AA/SA | 60/40 | Ethane diol | acetyl ester residue | 900 |

TABLE 2

| | Dicarboxylic acid | | | Diol | | |
|---|---|---|---|---|---|---|
| | Aromatic dicarboxylic acid | Aliphatic dicarboxylic acid | Ratio of dicarboxylic acids (mol %) | Aliphatic diol | Both terminals | Number-averaged molecular weight |
| P-37 | — | AA/SA | 60/40 | Ethane diol | acetyl ester residue | 1000 |
| P-38 | — | AA/SA | 60/40 | Ethane diol | acetyl ester residue | 2000 |
| P-39 | — | SA | 100 | Ethane diol | acetyl ester residue | 1000 |
| P-40 | — | SA | 100 | Ethane diol | acetyl ester residue | 3000 |
| P-41 | — | SA | 100 | Ethane diol | acetyl ester residue | 5500 |
| P42 | — | SA | 100 | Ethane diol | acetyl ester residue | 1000 |
| P-43 | PA | SA | 50/50 | Ethane diol | acetyl ester residue | 1000 |
| P-44 | PA | SA | 50/50 | Ethane diol | acetyl ester residue | 1500 |
| P-45 | PA | AA | 50/50 | Ethane diol | acetyl ester residue | 2000 |
| P-46 | PA | SA/AA | 40/30/30 | Ethane diol | acetyl ester residue | 1000 |
| P-47 | PA | SA/AA | 33/33/34 | Ethane diol | benzoic acid | 1000 |
| P-48 | PA | SA/AA | 50/20/30 | Ethane diol | acetyl ester residue | 1500 |
| P-49 | PA | SA/AA | 50/30/20 | Ethane diol | acetyl ester residue | 2000 |
| P-50 | TPA | SA | 50/50 | Ethane diol | acetyl ester residue | 1000 |
| P-51 | TPA | SA | 50/50 | Ethane diol | acetyl ester residue | 1500 |
| P-52 | TPA | SA | 45/55 | Ethane diol | acetyl ester residue | 1000 |
| P-53 | TPA | AA | 50/50 | Ethane diol | acetyl ester residue | 2200 |
| P-54 | TPA | SA | 35/65 | Ethane diol | acetyl ester residue | 1000 |
| P-55 | TPA | SA/AA | 40/30/30 | Ethane diol | acetyl ester residue | 1000 |
| P-56 | TPA | SA/AA | 50/20/30 | Ethane diol | acetyl ester residue | 1500 |
| P-57 | TPA | SA/AA | 50/30/20 | Ethane diol | acetyl ester residue | 2000 |
| P-58 | TPA | SA/AA | 20/20/60 | Ethane diol | acetyl ester residue | 1000 |
| P-59 | PA/TPA | AA | 15/35/50 | Ethane diol | acetyl ester residue | 1000 |
| P-60 | PA/TPA | AA | 25/25/50 | Ethane diol | acetyl ester residue | 1000 |
| P-61 | PA/TPA | SA/AA | 15/35/20/30 | Ethane diol | acetyl ester residue | 1000 |
| P-62 | PA/TPA | SA/AA | 20/30/20/30 | Ethane diol | acetyl ester residue | 1000 |
| P-63 | PA/TPA | SA/AA | 10/50/30/10 | Ethane diol | acetyl ester residue | 1000 |
| P-64 | PA/TPA | SA/AA | 5/45/30/20 | Ethane diol | acetyl ester residue | 1000 |
| P-65 | PA/TPA | SA/AA | 5/45/20/30 | Ethane diol | acetyl ester residue | 1000 |
| P-66 | IPA | AA/SA | 20/40/40 | Ethane diol | acetyl ester residue | 1000 |
| P-67 | 2,6-NPA | AA/SA | 20/40/40 | Ethane diol | acetyl ester residue | 1200 |
| P-68 | 1,5-NPA | AA/SA | 20/40/40 | Ethane diol | acetyl ester residue | 1200 |
| P-69 | 1,4-NPA | AA/SA | 20/40/40 | Ethane diol | acetyl ester residue | 1200 |
| P-70 | 1,8-NPA | AA/SA | 20/40/40 | Ethane diol | acetyl ester residue | 1200 |
| P-71 | 2,8-NPA | AA/SA | 20/40/40 | Ethane diol | acetyl ester residue | 1200 |

In Tables 1 and 2, PA means phthalic acid; TPA means terephthalic acid; IPA means isophthalic acid; AA means adipic acid; SA means succinic acid; 2,6-NPA means 2,6-naphthalene dicarboxylic acid; 2,8-NPA means 2,8-naphthalene dicarboxylic acid; 1,5-NPA means 1,5-naphthalene dicarboxylic acid; 1,4-NPA means 1,4-naphthalene dicarboxylic acid; and 1,8-NPA means 1,8-naphthalene dicarboxylic acid.

The amount of such the positive birefringent compound is preferably from 1 to 30 parts by mass, more preferably from 4 to 25 parts by mass and much more preferably from 10 to 20 parts by mass with respect to 100 part by mass of the cellulose acylate.

The cellulose acylate solution to be used for preparing the cellulose acylate-based film may be added with any additive other than the retardation enhancer. Examples of another additive include antioxidants, UV inhibitors, peeling promoters and plasticizers. They may be selected from any known additives.

The cellulose acylate solution may be added with any plasticizer in order to improve the mechanical properties of the prepared film or the drying rate. Examples of the plasticizer which can be used in the invention include those described in JP-A 2008-181105, [0067].

Any cycloolefin-based polymer film is preferably used as a retardation film constituting the second retardation region. Regarding the materials and methods employing the materials for preparing the cycloolefin-based polymer film, details are described in JP-A 2006-293342, [0098]-[0193], which can be referred to in the invention. Examples of the retardation film, constituting the second retardation region, include norbornene-based polymers such as ARTON (manufactured by JSR Corporation, and ZEONOR (manufactured by ZEON Corporation).

Various methods may be used for producing the retardation film constituting the second retardation region. For example, a solution casting method, melt-extrusion method, calendar method or condensing forming method may be used. Among these, a solution casting method and melt-extrusion method are preferable. And the retardation film constituting the second retardation region may be a film prepared by being subjected to a stretching treatment after forming. Stretching the film may be carried out according to a monoaxially or biaxially stretching method. Simultaneously- or successively-biaxially stretching is preferable. For achieving high optical anisotropy, a film should be subjected to a stretching treatment by a high stretching ratio. For example, the film is preferably subjected to a stretching treatment in both of the width direction and the lengthwise direction (machine direction). The stretching ratio is preferably from 3 to 100%. The stretching treatment may be carried out by using a tenter. Or the longitudinally stretching treatment may be carried out between the rolls.

As a solvent cast method, solution lamination-casting method such as co-solvent cast method, solution successive-casting method and coating method may be used. Using a co-solvent cast method or successive-solvent method, plural cellulose acylate solutions (dopes) for forming the layers respectively are prepared. According to a solution co-casting method (simultaneous multilayered casting), each dope for each layer of plural layers (for example three or more layers) is extruded simultaneously from each slit on a casting-support (such as band or drum) by using a geeser for casting, then peeled off from the support at an appropriate time, and then dried to form a film.

According to a solution successive-casting method, at first, a dope of the first layer is extruded from a geeser for casting to be cast on a support; and, after being dried or not being dried, then a dope for the second layer is extruded from the geeser for casting to be cast on the first layer. And if necessary, the three or more dopes are successively cast and laminated in this manner, then removed from the support at the appropriate time, and dried to form a film.

According to a coating method, generally, a core layer is prepared according to a solution casting method. And then, a prepared coating liquid is applied to the surfaces of the core layer respectively or simultaneously by using an appropriate apparatus and dried to form a layered film.

The retardation film constituting the second retardation region may be a layer formed of a liquid crystal composition fixed in a desired alignment state, or a lamination containing such a layer and a polymer film supporting the layer. In the latter embodiment, the polymer film may be used as a protective film of the polarizing element. Examples of the liquid crystal which can be used for preparing the retardation film constituting the second retardation region include rod-like liquid crystals, discotic liquid crystals and cholesteric liquid crystals.

For achieving further higher front CR, the retardation film(s), disposed at the rear-side, constituting the first retardation region, preferably has haze of equal to or smaller than 0.5, equal to or smaller than 0.3, and equal to or smaller than 0.2.

For reducing unevenness at the corner-side, it is necessary to reduce the deformation of the retardation film caused by external force to be applied to the film. The thickness of the retardation film disposed at the rear-side, constituting the second retardation region is preferably equal to or more than 20 micro meters and equal to or less than 200 micro meters, in terms of reducing unevenness at the corner-side and improving the productivity.

3. Polarizing Element

The polarizing element disposed at the front-side or rear-side is not limited. Any normal linear polarizing film can be used. The linear polarizing film is preferably a coated polarizing film as represented by a product of Optiva Inc., or a polarizing film formed by a binder and iodine or a dichroic dye. In the linear polarizing film, iodine or dichroic dye is aligned in the binder to exhibit a polarizing ability. The iodine or dichroic dye is preferably aligned along the binder molecules, or by an auto-texturing as in liquid crystal. The currently available commercial polarizer is generally prepared by immersing a stretched polymer film in a solution of iodine or a dichroic dye in a bath, thereby penetrating iodine or dichroic dye into the binder.

4. Protective Film

To the both surfaces of the front-side or rear-side polarizing element, a protective film is preferably bonded. However, as shown in FIG. 1, in the embodiment, each of the first and second retardation regions is formed of a single film, and the film also functions as a protective film, the liquid crystal cell-side protective film of the polarizing element may be omitted. According to the embodiment wherein the protective film and one or more retardation films are disposed between the rear-side polarizing element and the liquid crystal cell, the lamination of the protective film and the one or more retardation films is required to satisfy the optical properties as a whole which the first retardation region is required to satisfy. The preferable materials of the protective film are same as those of the retardation film constituting the first retardation region.

According to the embodiment wherein the protective film and one or more retardation films are disposed between the front-side polarizing element and the liquid crystal cell, the lamination of the protective film and the one or more retardation films as a whole preferably satisfy the optical properties which the second retardation region is required to satisfy. Being combined with one or more retardation films, the protective film may be a film contributing to improving the contrast ratio in the oblique direction and reducing the color shift in the black state, that is, a film exhibiting a certain degree of Re and Rth.

The protective film disposed on the outside of the front-side or rear-side polarizing element is especially not limited. Any polymer films may be used. Examples of the film are same as those which are exemplified above as examples of the retardation film constituting the first retardation region. For example, films containing cellulose acylate (e.g., cellulose acetate, cellulose propionate and cellulose butyrate), polyolefin (e.g., norbornene-based polymer, and polypropylene), poly(meth)acrylic acid ester (e.g., polymethylmethacrylate), polycarbonate, polyester or polysulfones as a major ingredient are exemplified. Commercially available polymer films (e.g., regarding cellulose acylate film, "TD80UL" (manufactured by FUJIFILM), and regarding norbornene-based polymer film, ARTON (manufactured by JSR) and ZEONOR (manufactured by NIPPON ZEON)) can be also used.

EXAMPLES

The invention is described in more detail with reference to the following Examples. In the following Examples, the amount of the material, reagent and substance used, their ratio, the operation with them and the like may be suitably modified or changed not overstepping the sprit and the scope of the invention. Accordingly, the scope of the invention should not be limited to the following Examples.

1. Production of Films 1 to 6:

Cellulose acylates shown in the following Table were prepared, which differ in the type of the acyl group therein and in the degree of substitution with the acyl group. Concretely, a catalyst, sulfuric acid (in an amount of 7.8 parts by mass relative to 100 parts by mass of cellulose) was added to cellulose, and then a carboxylic acid to give the acyl group was added thereto, and the cellulose was acylated at 40° C. In this, the type and the amount of the carboxylic acid were changed to thereby change and control the type pf the acyl group and the degree of substitution with the acyl group. After the acylation, the product was aged at 40° C. The low-molecular component was removed from the cellulose acylate by washing with acetone. In the Table, Ac means an acetyl group, and CTA means cellulose triacetate (cellulose ester derivative in which the acyl groups are all acetate groups).

(Cellulose Acylate Solution)

The following composition was put into a mixing tank and stirred to dissolve the ingredients. After heated at 90° C. for about 10 minutes, this was filtered through a paper filter having a mean pore size of 34 μm and a sintered metal filter having a mean pore size of 10 μm.

| Cellulose Acylate Solution | |
|---|---|
| Cellulose acylate | 100.0 mas. pts. |
| Triphenyl phosphate (TPP) | 7.8 mas. pts. |
| Biphenyldiphenyl phosphate (BDP) | 3.9 mas. pts. |
| Methylene chloride | 403.0 mas. pts. |
| Methanol | 60.2 mas. pts. |

(Mat Agent Dispersion)

The following composition containing the cellulose acylate solution that had been prepared according to the above method was put into a disperser and dispersed to prepare a mat agent dispersion.

| Mat Agent Dispersion | |
|---|---|
| Silica particles having a mean particle size of 16 nm (Aerosil R972, by Nippon Aerosil) | 2.0 mas. pts. |
| Methylene chloride | 72.4 mas. pts. |
| Methanol | 10.8 mas. pts. |
| Cellulose acylate solution | 10.3 mas. pts. |

(Additive Solution)

The following composition containing the cellulose acylate solution that had been prepared according to the above method was put into a mixing tank and dissolved by stirring under heat to prepare an additive solution.

| Additive Solution | |
|---|---|
| Retardation enhancer (1) | 20.0 mas. pts. |
| Methylene chloride | 58.3 mas. pts. |
| Methanol | 8.7 mas. pts. |
| Cellulose acylate solution | 12.8 mas. pts. |

100 parts by mass of the cellulose acylate solution, 1.35 parts by mass of the mat agent dispersion, and the additive solution in such an amount that the amount of the retardation enhancer (1) in the cellulose acylate film to be formed could be 10 parts by mass were mixed to prepare a dope for film formation. The amount of the additive is by mass relative to 100 parts by mass of the amount of the cellulose acylate.

The cellulose and the additive were changed as in the Table mentioned below, and the above solutions and dispersions were prepared.

The abbreviations of the additive and the plasticizer in the following Table are as follows:
CTA: triacetyl cellulose
TPP: triphenyl phosphate
BDP: biphenyldiphenyl phosphate
Retardation Enhancer (1):

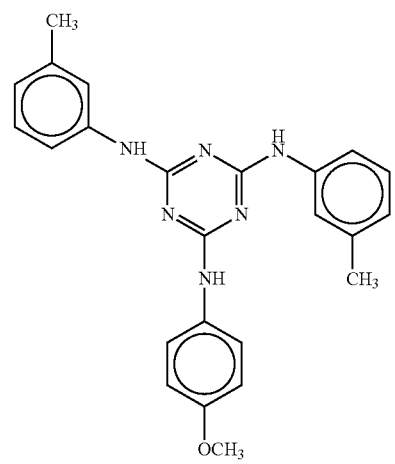

Using a band caster, the above dope was cast. The film having a residual solvent amount shown in the following Table was peeled away from the band, and in the section from the peeling to the tenter, this was stretched in the machine direction at the draw ratio shown in the following Table, and then, using a tenter, stretched in the cross direction at the draw ratio shown in the following Table. Immediately after the cross stretching, the film was shrunk (relaxed) in the cross direction at the ratio shown in the following Table, and then the film was removed from the tenter. The process gave a cellulose acylate film. The residual solvent amount in the film removed from the tenter was as in the following Table. Both edges of the film were trimmed away just before the winding zone to make the film have a width of 2000 mm, and the film was wound up into a roll film having a length of 4000 m. The draw ratio in stretching is shown in the following Table. Thus produced, the cellulose acylate film was analyzed at 25° C. and 60% RH to measure retardation Re and retardation Rth thereof at a wavelength of 590 nm. The results are shown in the following Table. Taking the mean refractive index of 1.48, Rth(λ) of the film was computed.

TABLE 3

| | | Cellulose acylate film | | | | | |
|---|---|---|---|---|---|---|---|
| | | Film 1 | Film 2 | Film 3 | Film 4 | Film 5 | Film 6 |
| | Cellulose Type | CTA | CTA | CTA | CTA | CTA | CTA |
| | Total degree of substitution | 2.81 | 2.81 | 2.81 | 2.81 | 2.81 | 2.81 |
| | Ratio of 6-positoon substitution | 0.320 | 0.320 | 0.320 | 0.320 | 0.320 | 0.320 |
| | Degree of 6-position substitution | 0.9 | 0.9 | 0.9 | 0.9 | 0.9 | 0.9 |
| | Substituent | Ac | Ac | Ac | Ac | Ac | Ac |
| Additive | Additive type | Retardation enhancer (1) | Retardation enhancer (1) | Retardation enhancer (1) | Retardation enhancer (1) | Retardation enhancer (1) | Retardation enhancer (1) |
| | Amount [parts by mass relative to 100 parts by mass of cellulose] | 10 | 10 | 12 | 6.4 | 9 | 2.2 |
| Plasticizer | Plasticizer type | TPP/BDP | TPP/BDP | TPP/BDP | TPP/BDP | TPP/BDP | TPP/BDP |
| | Amount [parts by mass relative to 100 parts by mass of cellulose] | 7.8/3.9 | 7.8/3.9 | 7.8/3.9 | 7.8/3.9 | 7.8/3.9 | 7.8/3.9 |
| Stretching condition | Ratio of longwise stretching [%] | 20 | 20 | 20 | 3 | 30 | 5 |
| | Ratio of cross stretching [%] | 32 | 40 | 35 | 32 | 60 | 40 |
| | Ratio of shrinking [%] | 7 | 7 | 7 | 7 | 7 | 7 |
| | Stretching speed [%/min] | 35 | 35 | 35 | 35 | 100 | 35 |
| | Film surface temperature [° C.] | 120 | 120 | 120 | 120 | 160 | 120 |
| | Amount of residual solvent at the time of peeling off [%] | 50 | 50 | 50 | 50 | 45 | 55 |
| | Amount of residual solvent at the time of termination of stretching [%] | 10 | 10 | 10 | 10 | 10 | 12 |

2. Production of Film 7:

According to the same method as that for the optical compensation layer A in Example 2 in JP-A 2003-315556, a retardation film 7 having Re(590) of 77 nm and Rth(590) of 47 nm was produced.

3. Production of Film 8:

A film Z-TAC (by FUJIFILM, having Re(590) of 1 nm and Rth(590) of −1 nm) was prepared. Separately, according to the same method as that for the optical compensation layer B in Example 2 in JP-A 2003-315556, a retardation film 8a having Re(590) of 1.5 mm and Rth(590) of 207 mm was produced. The retardation film 8a was stuck to the surface of Z-TAC to prepare a laminate film, and this is a film 8.

4. Production of Film 9:

The following composition was put into a mixing tank and stirred under heat to dissolve the ingredients, thereby preparing a cellulose acylate solution C.

<Composition of Cellulose Acylate Solution C>

| | |
|---|---|
| Cellulose acylate having a degree of substitution of 2.86 | 100 mas. pts. |
| Methylene chloride (first solvent) | 300 mas. pts. |
| Methanol (second solvent) | 54 mas. pts. |
| 1-Butanol | 11 mas. pts. |

The following composition was put into a different mixing tank, and stirred under heat to dissolve the ingredients, thereby preparing an additive solution D.
<Composition of Additive Solution D>

| | |
|---|---|
| Methylene chloride | 80 mas. pts. |
| Methanol | 20 mas. pts. |
| Optical anisotropy reducer A-7 mentioned below | 40 mas. pts. |

Optical Anisotropy Reducer A-7:

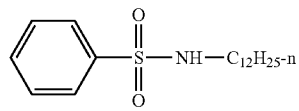

40 parts by mass of the additive solution D was added to 465 parts by mass of the cellulose acylate solution C to prepare a dope. The transparency of the dope solution was at least 85% and was good.

The dope was cast onto a support to form a cellulose acylate film having a thickness of 80 μm. This is a film 9.

5. Production of Film 10:

According to the description in paragraphs [0223] to [0226] in JP-A 2007-127893, a stretched film (protective film A) was produced. Onto the surface of the stretched film of protective film A, an easy-adhesion layer coating composition P-2 prepared according to the description in [0232] in the patent publication was applied according to the method described in [0246] in the patent publication, thereby forming an easy-adhesion layer thereon. This film is a film 10.

6. Preparation of Film 11:

As a film 11, a commercially-available triacetyl cellulose film "TF80UL" (by FUJIFILM) was prepared.

7. Production of Films 12 to 16:

(Preparation of Polymer Solution)
1) Cellulose Acylate:
From the following cellulose acylates A and B, one as indicated in Table 4 below was selected and used here. The cellulose acylate was heated at 120° C. and dried so that its water content could be at most 0.5% by mass, and 20 parts by mass of the thus-dried cellulose acylate was used here.
Cellulose acylate A:
A powder of cellulose acylate having a degree of substitution of 2.93 was used. The viscosity-average degree of polymerization of the cellulose acylate A was 300, and the degree of acetyl substitution at the 6-position thereof was 0.94.
Cellulose acylate B:
A powder of cellulose acylate having a degree of substitution of 2.86 was used. The viscosity-average degree of polymerization of the cellulose acylate B was 300, the degree of acetyl substitution at the 6-position thereof was 0.89, the acetone extract was 7% by mass, the ratio of mass-average molecular weight/number-average molecular weight was 2.3, the water content was 0.2% by mass, the viscosity in a 6 mas. % dichloromethane solution was 305 mPa·s, the residual acetate amount was at most 0.1% by mass, the Ca content was 65 ppm, the Mg content was 26 ppm, the iron content was 0.8 ppm, the sulfate ion content was 18 ppm, the yellow index was 1.9, and the free acetic acid amount was 47 ppm. The mean particle size of the powder was 1.5 mm, and the standard deviation thereof was 0.5 mm.
2) Solvent:
The following solvent A was used here. The water content of each solvent was at most 0.2% by mass.
Solvent A:
Dichloromethane/methanol=90/10 by mass
3) Additive:
Of the following additives A and B, one as indicated in Table 4 below was selected and used here.
Additive A:
Silicone dioxide fine particles (particle size, 20 nm; Mohs hardness, about 7) (0.08 mas.pts.)
Additive B:
Triphenyl phosphate (1.6 mas.pts.)
Biphenyldiphenyl phosphate (0.8 mas.pts.)
Silicon dioxide fine particles (particle size, 20 nm; Mohs hardness, about 7) (0.08 mas.pts.)
4) Dissolution:
According to the following dissolution step A, the cellulose acetate was swollen or dissolved.
Dissolution Step A:
The above-mentioned solvent and additive were put into a 400-liter stainless dissolver tank having a stirring blade and cooled with cooling water circulating around it, and with stirring and dispersing them, the above-mentioned cellulose acylate was gradually added thereto. After the addition, this was stirred at room temperature for 2 hours and swollen for 3 hours, and then again stirred to give a swollen cellulose acylate solution.

For the stirring, used were a dissolver-type eccentric stirring shaft stirring at a peripheral speed of 15 m/sec (shear stress $5 \times 10^4$ kgf/m/sec² [$4.9 \times 10^5$ N/m/sec²]), and a stirring shaft having an anchor blade around the center axis and stirring at a peripheral speed of 1 m/sec (shear stress $1 \times 10^4$ kgf/m/sec² [$9.8 \times 10^4$ N/m/sec²]). For the swelling, the high-speed stirring shaft was stopped and the peripheral speed of the stirring shaft having an anchor blade was kept at 0.5 m/sec.

From the tank, the swollen solution was heated up to 50° C. in a jacketed pipe, and further heated up to 90° C. under a pressure of 2 MPa for complete dissolution. The heating time was 15 minutes. In this process, the filter, the housing and the pipe exposed to high temperature were all made of a hastelloy alloy excellent in corrosion resistance and were equipped with a jacket through which a heat carrier for heating the solution and keeping the solution warm was circulated.

Next, this was cooled to 36° C. to give a cellulose acylate solution.
5) Filtration:
Thus obtained, the cellulose acylate solution was filtered through filter paper having an absolute filtration accuracy of 10 μm (#63, by Toyo Filter Paper) and then through a sintered metal filter having an absolute filtration accuracy of 2.5 μm (FH025, by Paul) to give a filtered polymer solution.

(Production of Film)

Films were produced according to the following film production process A.

Film Production Process A:

The above-mentioned cellulose acylate solution was heated at 30° C., and then cast onto a mirror-face stainless support having a band length of 60 m set at 15° C. through a caster, Geeser (described in JP-A 11-314233). The casting speed was 50 m/min, and the coating width was 200 cm. The space temperature in the entire casting zone was set at 15° C. At 50 cm before the end point of the casting zone, the cellulose acylate film thus cast and rolled was peeled off from the band, and exposed to dry air at 45° C. applied thereto. Next, this was further dried at 110° C. for 5 minutes and at 140° C. for 10 minutes, thereby giving a transparent cellulose acylate film.

(Stretching)

As shown in Table 4 below, the film was stretched according to any of the following stretching process A or B.

Stretching Process A:

The obtained film was stretched using an apparatus having a heating zone between two nip rolls. The distance between the nip rolls was so controlled that the aspect ratio (distance between nip rolls/base inlet port width) could be 0.1, and the base temperature before the heating zone was 25° C. The temperature in the heating zone was as in Table 4 below. By controlling the speed ratio of the speed of the feeding nip rolls to the speed of the taking-out nip rolls, the draw ratio in stretching was controlled as in Table 4 below.

Stretching Process B:

Both sides of the obtained film were held with tenter clips, and the film was stretched in the direction perpendicular to the machine direction in the heating zone. The temperature in the heating zone was as in Table 4 below, and the draw ratio in stretching, as computed from the shrinkage by the tenter, was as in Table 4 below.

According to the above, films 12 to 16 were produced. The production condition is shown in Table 4 below.

TABLE 4

| | Cellulose acylate | Additive | Step | Stretching Temperature [° C.] | Stretching [%] |
|---|---|---|---|---|---|
| Film 12 | A | A | A | 185 | 15 |
| Film 13 | A | A | A | 185 | 10 |
| Film 14 | B | B | B | 170 | 30 |
| Film 15 | B | A | A | 200 | 35 |
| Film 16 | B | B | B | 180 | 40 |

8. Production of Film 17:

A film 17 was produced in the same manner as that for the film 4, for which, however, the amount of the retardation enhancer (1) to be added was changed to 12 parts by mass, the draw ratio in MD stretching was 20% and the draw ratio in CD direction was 35%.

9. Production of Film 18:

A film 18 was produced in the same manner as that for the film 5, for which, however, the amount of the retardation enhancer (1) to be added was changed to 7.2 parts by mass, the draw ratio in MD stretching was 35% and the draw ratio in CD direction was 75%.

10. Preparation of Film 19:

A commercially-available norbornene polymer film, ZEONOR ZF14-060 (by Optes) was processed for corona discharge treatment on the surface thereof, using a solid state corona discharger, 6 KVA (by Pillar). This is a film 19. The thickness of the film was 60 μm.

11. Preparation of Film 20:

A commercially-available cycloolefin polymer film, ARTON FLZR50 (by JSR) was processed for corona discharge treatment on the surface thereof, in the same manner as that for the film 18. This is a film 20. The thickness of the film was 50 μm.

12. Preparation of Film 21:

A commercially-available norbornene polymer film, ZEONOR ZF14-100 (by Optes) was biaxially stretched at a temperature of 142° C. in MD by 1.55 times and in TD by 1.8 times with its edges fixed, and then processed for corona discharge treatment on the surface thereof, using a solid state corona discharger, 6 KVA (by Pillar). This is a film 21. The thickness of the film was 38 μm.

13. Production of Film 22:

Cellulose acylate propionate, CAP482-20 (by Eastman Chemical, having a degree of acetyl substitution of 0.2 and a degree of propionyl substitution of 2.4) was prepared. A plasticizer, 1,4-phenylene-tetraphenyl phosphate (8% by mass) and an antiaging agent (antioxidant), IRGANOX-1010 (by Ciba Specialty Chemicals) (0.5% by mass) were added thereto, and mixed for 30 minutes with a tumbler mixer. The resulting mixture was dried with a moisture-removing hot air drier (Matsui Seisaku-sho's DMZ2), at a hot air temperature of 150° C. and at a dew point of −36° C. Next, the mixture was fed into a double-screw extruder (by Technovel); and with adding thereto a mat agent, AEROSIL 200V (0.016-μm silica fine particles by Nippon Aerosil) through the additive hopper port provided in the intermediate part of the extruder via a continuous feeder so that its throughput flow could be 0.05%, and also thereto, a UV absorbent, TINUVIN 360 (by Ciba Specialty Chemicals) through the same port to be at a throughput flow of 0.5%, the mixture was melt-extruded. Thus melt-extruded, the film formed had a thickness of 220 μm.

The film was biaxially stretched at a temperature of 142° C. in MD by 1.3 times and in TD by 2.4 times with its edges fixed. This film is a film 22. The thickness of the film was 70 μm.

14. Production of Film 23:

A film was produced in the same manner as that for the film 1, for which, however, the cellulose acylate shown in the Table below was used as the starting material and the production condition was changed to the Table below. This is a film 23. The abbreviations of the additive and the plasticizer mentioned below are the same as above.

TABLE 5

| Cellulose acylate film | | Film 23 |
|---|---|---|
| | Cellulose Type | CTA |
| | Total degree of substitution | 2.81 |
| | Ratio of 6-positoon substitution | 0.320 |
| | Degree of 6-position substitution | 0.9 |
| | Substituent | Ac |
| Additive | Additive type | Retardation enhancer (1)/Retardation enhancer (2) |
| | Amount [parts by mass relative to 100 parts by mass of cellulose] | 3.2/7.7 |
| Plasticizer | Plasticizer type | TPP/BDP |
| | Amount [parts by mass relative to 100 parts by mass of cellulose] | 7.8/3.9 |
| Stretching condition | Ratio of longwise stretching [%] | 3 |
| | Ratio of cross stretching [%] | 47 |
| | Ratio of shrinking [%] | 7 |
| | Stretching speed [%/min] | 35 |
| | Film surface temperature [° C.] | 120 |
| | Amount of residual solvent at the time of peeling off [%] | 55 |
| | Amount of residual solvent at the time of termination of stretching [%] | 13 |

Retardation Enhancer (2):

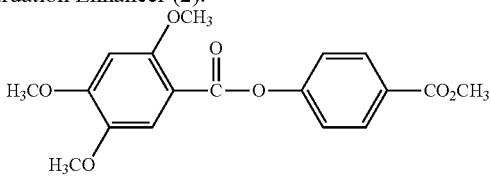

15. Production of Film 24:

(Preparation of Polymer Solution)
1) Polymer:
Used was a polycarbonate copolymer comprising bisphenol ingredients of bisphenol A and 9,9-bis(4-hydroxy-3-methylphenyl)fluorenone. The polymer was heated at 120° C. and dried to have a water content of at most 0.5% by mass. 20 parts by mass of the polymer was used here.
2) Solvent:
The following solvent A was used. The water content of the solvent was at most 0.2% by mass.
Solvent A:
  Dichloromethane=100 mas.pts.
3) Additive:
The following additive A was used.
Additive A:
  Silicone dioxide fine particles (particle size, 20 nm; Mohs hardness, about 7) (0.08 mas.pts.)
4) Dissolution:
According to the following dissolution step A, the polymer was swollen or dissolved.
Dissolution Step A:
The above-mentioned solvent and additive were put into a 400-liter stainless dissolver tank having a stirring blade and cooled with cooling water circulating around it, and with stirring and dispersing them, the above-mentioned polymer was gradually added thereto. After the addition, this was stirred at room temperature for 2 hours to give a polymer solution.
5) Filtration:
Thus obtained, the polymer solution was filtered through filter paper having an absolute filtration accuracy of 10 μm (#63, by Toyo Filter Paper) and then through a sintered metal filter having an absolute filtration accuracy of 2.5 μm (FH025, by Paul) to give a filtered polymer solution.

(Production of Film)
A film was produced according to the following film production process A.
Film Production Process A:
The above-mentioned polymer solution was heated at 30° C., and then cast onto a mirror-face stainless support having a band length of 60 m and set at 15° C. through a caster, Geeser (described in JP-A 11-314233). The casting speed was 10 m/min, and the coating width was 150 cm. The space temperature in the entire casting zone was set at 15° C. At 50 cm before the end point of the casting zone, the polymer film thus cast and rolled was peeled off from the band, and exposed to dry air at 45° C. applied thereto. Next, this was further dried at 110° C. for 5 minutes and at 140° C. for 10 minutes, thereby giving a transparent polymer film.
(Stretching)
The film was stretched according to the following stretching process A.
Stretching Process A:
The obtained film was stretched using an apparatus having a heating zone between two nip rolls. The distance between the nip rolls was so controlled that the aspect ratio (distance between nip rolls/base inlet port width) could be 8, and the base temperature before the heating zone was 25° C. The heating zone was at 210° C. By controlling the speed ratio of the speed of the feeding nip rolls to the speed of the taking-out nip rolls, the film was stretched to give a transparent polymer film having Re/Rth=140/72 nm.

16. Production of Film 25:

A polyimide produced from 2,2'-bis(3,4-dicarboxyphenyl)hexafluoropropane and 2,2'-bis(trifluoromethyl)-4,4'-diaminobiphenyl was dissolved in cyclohexanone to prepare a 15 mas. % solution. The polyimide solution was applied onto a biaxially-stretched polyester film (substrate) and dried at 120° C. for 10 minutes to form therein a non-liquid-crystalline polymer layer (optical compensatory layer b) having a thickness of 5 μm, thereby producing a laminate.
The laminate was stuck to the polymer 9 produced in the above, using an adhesive. The surface of the optical compensatory layer B was kept in contact with the surface of the film 9. Next, the substrate was removed to give a film 25.

17. Production of Film 26:

The following composition was put into a mixing tank and stirred under heat to dissolve the ingredients. This was filtered through a paper filter having a mean pore size of 34 μm and a sintered metal filter having a mean pore size of 10 μm to prepare a cellulose acylate solution.
(Cellulose Acylate Solution)

| | |
|---|---|
| Cellulose acetate having a degree of substitution of 2.81 | 100.0 mas. pts. |
| Retardation enhancer (1) | 8.5 mas. pts. |
| Retardation enhancer (3) | 7.0 mas. pts. |
| Methylene chloride | 428.4 mas. pts. |
| Methanol | 64.0 mas. pts. |

The composition of the retardation enhancer (3) is shown in Table 6 below. In Table 6, EG means ethylene glycol, TPA means terephthalic acid, PA means phthalic acid, AA means adipic acid, SA means succinic acid. The retardation enhancer (3) is a non-phosphate compound, and is a compound functioning as a retardation enhancer. The terminal of the retardation enhancer (3) is blocked with an acetyl group.

TABLE 6

| Retardation enhancer | Glycol unit | | Dicarboxylic acid unit | | | | | |
|---|---|---|---|---|---|---|---|---|
| | Ratio of blocking both terminal hydroxyls (%) | EG (%) | Averaged number of carbon atoms | TPA (mole %) | PA (mole %) | AA (mole %) | SA (mole %) | Averaged number of carbon atoms | Molecular weight |
| (3) | 100 | 100 | 2 | 45 | 5 | 20 | 30 | 6 | 840 |

The cellulose acylate solution prepared in the above was rapidly cast, using a band caster. The film having a residual solvent amount of about 30% by mass was peeled away from the band, and stretched in the cross direction at 140° C. and at a draw ratio of 16%, using a tenter. Next, the film transferred with the tenter was then transferred with rolls, and further dried from 110° C. to 150° C. and wound up. Thus, a film 26 was produced. The thickness of the film was 85 µm.

The production of the film 26 was free from the problems with the production of the film 1 (smoking in high-temperature treatment in the drying step, adhesion of vaporized oil to the parts of the machine to cause operation failure or adhesion thereof to film to cause surface failure of the film).

This is because the retardation enhancer (3) used in the production of the film 26 functions also as a plasticizer, and therefore, the production of the film 26 does not require the conventional low-molecular-weight plasticizers TPP and BDP as in the production of the film 1.

Use of the compound having a positive birefringence such as the retardation enhancer (3) solves the above-mentioned problems, and therefore, it may be said that the compound having a positive birefringence is a preferred retardation enhancer for film production.

18. Production of Film 27:

(Cellulose Acylate Solution for Low-Substitution Layer)
The following composition was put into a mixing tank and stirred under heat to dissolve the ingredients, thereby preparing a cellulose acylate solution for low-substitution layer.

| | |
|---|---|
| Cellulose acetate having a degree of substitution of 2.43 | 100.0 mas. pts. |
| Retardation enhancer (1) | 4.0 mas. pts. |
| Retardation enhancer (4) | 10.0 mas. pts. |
| Methylene chloride | 351.5 mas. pts. |
| Methanol | 52.5 mas. pts. |

The composition of the retardation enhancer (4) is shown in Table 7 below. In Table 7, EG means ethylene glycol, PG means propylene glycol, BG means butylene glycol, TPA means terephthalic acid, PA means phthalic acid, AA means adipic acid, SA means succinic acid. The retardation enhancer (4) is a non-phosphate compound, and is a compound functioning as a retardation enhancer. The terminal of the retardation enhancer (4) is blocked with an acetyl group.

(Cellulose Acylate Solution for High-Substitution Layer)
The following composition was put into a mixing tank and stirred to dissolve the ingredients, thereby preparing a cellulose acylate solution for high-substitution layer.

| | |
|---|---|
| Cellulose acetate having a degree of substitution of 2.79 | 100.0 mas. pts. |
| Retardation enhancer (4) | 11.0 mas. pts. |
| Silica particles having a mean particle size of 16 nm (Aerosil R972, by Nippon Aerosil) | 0.15 mas. pts. |
| Methylene chloride | 395.0 mas. pts. |
| Methanol | 59.0 mas. pts. |

(Production of Cellulose Acylate Sample)
The two cellulose acylate solutions were cast onto a band to form thereon a core layer having a thickness of 82 µm from the cellulose acylate solution for low-substitution layer and to form a skin layer A and a skin layer B each having a thickness of 2 µm from the cellulose acylate solution for high-substitution layer. The formed film was peeled away from the band, clipped, and stretched in the cross direction by 18% at a stretching temperature of 180° C. while the residual solvent amount was 20% relative to the total mass of the film, using a tenter. Next, the film was unclipped and dried at 130° C. for 20 minutes. This is a film 27.

19. Production of Film 28:

A film 28 was produced in the same manner as that for the film 27, for which, however, the thickness of the core layer was changed to 75 µm and the draw ratio in stretching was changed to 20%.

20. Production of Film 29:

(Cellulose Acylate Solution for Low-Substitution Layer)
The following composition was put into a mixing tank and stirred under heat to dissolve the ingredients, thereby preparing a cellulose acylate solution for low-substitution layer.

| | |
|---|---|
| Cellulose acetate having a degree of substitution of 2.43 | 100.0 mas. pts. |
| Retardation enhancer (4) | 18.5 mas. pts. |
| Methylene chloride | 365.5 mas. pts. |
| Methanol | 54.6 mas. pts. |

TABLE 7

| Retardation enhancer | Glycol unit | | | | Dicarboxylic acid unit | | | |
|---|---|---|---|---|---|---|---|---|
| | Ratio of blocking both terminal hydroxyls (%) | EG (%) | PG (%) | Averaged number of carbon atoms | TPA (mole %) | SA (mole %) | Averaged number of carbon atoms | Molecular weight |
| (4) | 100 | 50 | 50 | 2.5 | 55 | 45 | 6.2 | 730 |

(Cellulose Acylate Solution for High-Substitution Layer)

The following composition was put into a mixing tank and stirred to dissolve the ingredients, thereby preparing a cellulose acylate solution for high-substitution layer.

| | |
|---|---|
| Cellulose acetate having a degree of substitution of 2.79 | 100.0 mas. pts. |
| Retardation enhancer (4) | 11.0 mas. pts. |
| Silica particles having a mean particle size of 16 nm (Aerosil R972, by Nippon Aerosil) | 0.15 mas. pts. |
| Methylene chloride | 395.0 mas. pts. |
| Methanol | 59.0 mas. pts. |

(Production of Cellulose Acylate Sample)

The two cellulose acylate solutions were cast onto a band to form thereon a core layer having a thickness of 37 μm from the cellulose acylate solution for low-substitution layer and to form a skin layer A and a skin layer B each having a thickness of 2 μm from the cellulose acylate solution for high-substitution layer. The formed film was peeled away from the band, dried at a temperature of 200° C. for 30 minutes while the residual solvent amount was 20% relative to the total mass of the film, and then further dried at 130° C. for 20 minutes. This is a film 29.

21. Properties of Films 1 to 29:

The properties of the above films 1 to 29 are shown in the following Table. Re(590) and Rth(590) of each film were measured as follows: A sample having a size of 30 mm×40 mm of each film was conditioned at 25° C. and 60% RH for 2 hours, and analyzed with KOBRA 21ADH (by Oji Scientific Instruments) at a wavelength of 590 nm. For the films 1 to 6, 9, 11 to 18, 22, 23 and 26 to 29, an assumed mean refractive index of 1.48 and the film thickness were inputted and the data were computed. For the other films, the assumed refractive index was 1.52 for the films 7 and 20, 1.60 for the film 8, 1.50 for the film 10, 1.53 for the films 19 and 21, 1.59 for the film 24, and 1.58 for the film 25.

TABLE 8

| | Thickness (μm) | Re(590) (nm) | Rth(590) (nm) |
|---|---|---|---|
| Film 1 | 80 | 50 | 240 |
| Film 2 | 80 | 60 | 250 |
| Film 3 | 80 | 70 | 265 |
| Film 4 | 85 | 55 | 200 |
| Film 5 | 60 | 70 | 215 |
| Film 6 | 60 | 50 | 120 |
| Film 7 | 50 | 77 | 47 |
| Film 8 | 68 | 1.5 | 207 |
| Film 9 | 80 | 0.5 | −2.1 |
| Film 10 | 30 | 0.8 | 1.5 |
| Film 11 | 80 | 3 | 45 |
| Film 12 | 57 | 15 | 10 |
| Film 13 | 59 | 10 | 10 |
| Film 14 | 62 | 10 | 30 |
| Film 15 | 51 | 10 | 25 |
| Film 16 | 57 | 15 | 25 |
| Film 17 | 70 | 62 | 238 |
| Film 18 | 58 | 67 | 223 |
| Film 19 | 60 | 1.9 | 3.1 |
| Film 20 | 50 | 1.8 | 3 |
| Film 21 | 38 | 60 | 250 |
| Film 22 | 70 | 60 | 250 |
| Film 23 | 45 | 75 | 160 |
| Film 24 | 80 | 140 | 72 |
| Film 25 | 85 | 4.5 | 178 |
| Film 26 | 85 | 60 | 250 |
| Film 27 | 86 | 60 | 250 |
| Film 28 | 79 | 61 | 230 |
| Film 29 | 41 | 0.5 | 45 |

22. Production of Polarizers:

A polyvinyl alcohol (PVA) film having a thickness of 80 μm was dyed by dipping it in an aqueous iodine solution having an iodine concentration of 0.05% by mass at 30° C. for 60 seconds, then stretched in the machine direction by 5 times the original length while dipped in an aqueous boric acid solution having a boric acid concentration of 4% by mass for 60 seconds, and thereafter dried at 50° C. for 4 minutes to give a polarizing film having a thickness of 20 μm.

Of the above-mentioned films 1 to 29, the cellulose acylate films were saponified as follows: Each film was dipped in an aqueous sodium hydroxide solution (1.5 mol/liter) at 55° C., and then fully rinsed with water to remove sodium hydroxide. Next, this was dipped in an aqueous diluted sulfuric acid solution (0.005 mol/liter) at 35° C. for 1 minute, and then dipped in water to fully remove the aqueous diluted sulfuric acid solution. Finally, the sample was fully dried at 120° C.

Any two sheets of the films 1 to 29 were combined with the polarizing film sandwiched therebetween to produce a laminate polarizer. The combination is shown in Table below.

The cellulose acylate films, 1 to 9, 11 to 18 and 22 to 29 were stuck, using a polyvinyl alcohol adhesive; and the film 10 was stuck via an easy-adhesion layer stuck to the surface side of the polarizing element; and the films 19 to 21 were stuck, using an acrylic adhesive.

The films 1 to 24 and 26 to 28 were so stuck that the in-plane slow axis thereof could be in parallel to the transmission axis of the polarizing element; and the films 25 and 29 were so stuck that the in-plane slow axis thereof could be perpendicular to the transmission axis of the polarizing element.

23. Production of VA-mode Liquid-Crystal Display Devices:

(1) Preparation of Liquid-Crystal Cell 1:

As a VA-mode liquid-crystal cell, LC-42RX1W (by Sharp) was prepared. This is a liquid-crystal cell 1. Δnd(590) of the liquid-crystal cell 1 was measured with AXOMETRICS' AXOSCAN using the associated software, and was 300 nm.

(2) Preparation of Liquid-Crystal Cell 2:

(2)-1 Formation of Red Pixel Part:

<Formation of Curable Composition Layer (Coating Film)>

A coloring photosensitive composition of Example 17 in JP-A 2009-144126 was dispersed for 30 minutes with a bead disperser Ultra-apex Mill (by Kotobuki Kogyo) using 0.05 mmϕ zirconia beads, and the thus-processed composition was applied in a mode of slit-coating, to a glass substrate (550 mm×650 mm) with a black matrix (BM) formed on one surface thereof, on the BM-formed surface thereof, using a slit coating apparatus equipped with a slit head having a slit clearance of 100 μm and a coating effective width of 500 mm, thereby forming a curable composition layer (coating film) on the substrate.

In the slit coating, the distance between the slit and the glass substrate and the flow rate of the coating liquid were so controlled that the thickness of the layer after post-baking could be 2.0 µm. The coating rate was 100 mm/sec.

<Exposure to Light, Development, Rinsing>

Next, the curable composition layer was pre-baked with a hot plate at 80° C. for 120 seconds, and then exposed to light at 90 mJ/cm$^2$ through a proximity gap of 180 µm, using an exposure apparatus, Hitachi's LE5565 (illuminance, 20 mW/cm$^2$).

The exposed substrate was shower-developed with a 1.0% developer (25° C.) of a potassium hydroxide developer, CDK-1 (by FUJIFILM Electronics Materials) for 60 seconds, and then rinsed with pure water.

In that manner, a red pixel part was formed on the glass substrate. The substrate was post-baked in an oven at 220° C. for 30 minutes, thereby giving a glass substrate with red pixel formed thereon.

(2)-2 Formation of Green Pixel Part:

A green pixel part was formed on the red pixel-formed glass substrate in the same manner as that for the formation of the red pixel part, for which, however, a coloring photosensitive composition of Example 18 in JP-A 2009-144126, which had been further dispersed for 30 minutes with a bead disperser Ultra-apex Mill (by Kotobuki Kogyo) using 0.05 mmφ zirconia beads, was used. The substrate was post-baked in an oven at 220° C. for 30 minutes, thereby giving a glass substrate with red pixel and green pixel formed thereon.

(2)-3 Formation of Blue Pixel Part:

A blue pixel part was formed on the red pixel and green pixel-formed glass substrate in the same manner as that for the formation of the red pixel part, for which, however, a coloring photosensitive composition of Example 19 in JP-A 2009-144126, which had been further dispersed for 30 minutes with a bead disperser Ultra-apex Mill (by Kotobuki Kogyo) using 0.05 mmφ zirconia beads, was used. The substrate was post-baked in an oven at 230° C. for 30 minutes, thereby giving a color filter substrate.

On the color filter substrate produced in the above, formed was a transparent electrode of ITO (indium tin oxide) through sputtering. Next, according to Example 1 in JP-A 2006-64921, a spacer was formed on the ITO film in the area corresponding to the upper part of the partition wall (black matrix). This is a front-side substrate.

Separately, a glass substrate was prepared with a transparent electrode of ITO formed thereon, as a counter substrate. The transparent electrode of the color filter substrate and the counter substrate was patterned for PVA mode, and a vertical alignment film of polyimide was formed thereon.

The liquid-crystal cell taken out of a liquid-crystal panel, Sharp's LC-37GX1W was disassembled, and the array substrate disposed on the light source side was taken out, its surface was washed with ethanol, and the array substrate was stuck to the glass side of the counter electrode, using a matching oil for glass. This is a rear-side substrate.

Next, a UV-curable resin sealant was applied to the front-side substrate in the position corresponding to the black matrix frame disposed in the periphery to surround the RGB pixel group of the color filer thereof, according to a dispenser system, then a VA-mode liquid crystal was dropwise applied thereto, and the front-side substrate was stuck to the rear-side substrate. The thus-stuck substrates were irradiated with UV and heat-treated to cure the sealant. According to the process, a liquid-crystal cell 2 was produced.

Subsequently, Δnd(590) of the thus-produced liquid-crystal cell 2 was measured with AXOMETRICS' AXOSCAN using the associated software, and was 300 nm.

(3) Preparation of Liquid-Crystal Cell 3:

A liquid-crystal cell 3 was prepared according to the same method as that for the liquid-crystal cell 2, for which, however, in the process of producing the color filter substrate, a coloring photosensitive composition of Example 17 in JP-A 2009-144126 was used for forming the red pixel part, a coloring photosensitive composition of Example 18 in JP-A 2009-144126 was used for forming the green pixel part, and a coloring photosensitive composition of Example 19 in JP-A 2009-144126 was used for forming the blue pixel part.

Subsequently, Δnd(590) of the thus-produced liquid-crystal cell 3 was measured with AXOMETRICS' AXOSCAN using the associated software, and was 300 nm.

(4) Preparation of Liquid-Crystal Cell 4:

A liquid-crystal cell 4 was prepared according to the same method as that for the liquid-crystal cell 2, in which, however, the pillar-like spacer pattern formed in the area corresponding to the upper part of the partition wall of the ITO film on the color filter substrate has a diameter of 16 µm and a mean height of 3.0 µm.

Δnd(590) of the thus-produced liquid-crystal cell 4 was measured with AXOMETRICS' AXOSCAN using the associated software, and was 240 nm.

(5) Preparation of Liquid-Crystal Cell 5:

A glass substrate with a transparent electrode of ITO formed thereon was prepared, and a transparent pillar-like spacer pattern having a diameter of 16 µm and a mean height of 3.7 µm was formed on the ITO film of the glass substrate. The transparent electrode was patterned for PVA mode, and a vertical alignment film of polyimide was formed thereon to give a front-side substrate.

A rear-side substrate was prepared in the same manner as that for the liquid-crystal cell 2.

Next, a UV-curable resin sealant was applied to the front-side substrate on the pillar spacer thereon, according to a dispenser system, then a VA-mode liquid crystal was dropwise applied thereto, and the front-side substrate was stuck to the rear-side substrate. The thus-stuck substrates were irradiated with UV and heat-treated to cure the sealant. According to the process, a liquid-crystal cell 5 was produced.

Subsequently, Δnd(590) of the thus-produced liquid-crystal cell 5 was measured with AXOMETRICS' AXOSCAN using the associated software, and was 300 nm.

(6) Preparation of Liquid-Crystal Cell 6 (for Reference):

A liquid-crystal cell 6 was prepared according to the same method as that for the liquid-crystal cell 2, for which, however, in the process of producing the color filter substrate, a coloring photosensitive composition of Comparative Example 12 in JP-A 2009-144126 was used for forming the red pixel part, a coloring photosensitive composition of Comparative Example 13 in JP-A 2009-144126 was used for forming the green pixel part, and a coloring photosensitive composition of Comparative Example 14 in JP-A 2009-144126 was used for forming the blue pixel part.

(7) Computation of Member-Contrast Ratio of the Front-Side Substrate and the Rear-Side Substrate of the Produced Liquid-Crystal Cell:

The liquid-crystal cell 1 was disassembled, in which the substrate disposed on the panel side is a front-side substrate, and the array substrate disposed on the light source side is a rear-side substrate. These were washed with ethanol on their surfaces, and analyzed to compute the part CR of the front-side substrate and the rear-side substrate.

A polarizer (HLC2-2518, by Sanritz) was put on the backlight of a liquid-crystal panel, Sharp's LC-32 GH5, and on this, the front-side substrate or the rear-side substrate of the above-mentioned liquid-crystal cells 1 to 5 fitted to a rotary stage SGSP-120YAW (by Sigma Koki) was disposed in parallel to each other at a distance of 2 mm from the polarizer. Briefly, these were so disposed that the array wiring on the rear-side substrate and the black matrix on the front-side substrate could correspond to the polarization axis of the polarizer. Further on this, a polarizer, HLC2-2518 (by Sanritz) fitted to a rotary stage was disposed so that the distance between the polarizers could be 52 mm. Using a tester BM5A (by TOPCON) in a dark room, the brightness at the time of the black state and the white state in the normal direction was measured, and the front contrast ratio A (white brightness/black brightness) was computed. In this, the polarizer was rotated, and the lowest brightness was the brightness at the time of the black state. Then, the polarizer was rotated by 90 degrees, and the brightness was the brightness at the time of the white state.

Next, in the above embodiment, the color filter substrate or the array substrate was removed, and the brightness at the time of the black state or the white state with the polarizer alone was measured, and the front contrast ratio B was computed.

To remove the influence of the front contrast ratio B with the polarizer on the front contrast ratio A, the member-contrast ratio was computed according to the following formula:

Member-Contrast Ratio=1/(1/front contrast ratio $A$−1/front contrast ratio $B$).

Based on the computed member-contrast ratio, the ratio of (member-contrast ratio of the front-side substrate)/(member-contrast ratio of the rear-side substrate) was computed, and the data are shown in the following Table.

TABLE 9

| Type of liquid crystal cell | Δ nd (590) (nm) | Member-contrast ratio of front-side substrate/ Member-contrast ratio of rear-side substrate |
|---|---|---|
| Liquid crystal cell 1 | 300 | 3.1 |
| Liquid crystal cell 2 | 300 | 3.5 |
| Liquid crystal cell 3 | 300 | 3.0 |
| Liquid crystal cell 4 | 240 | 3.5 |
| Liquid crystal cell 5 | 300 | 114 |
| Liquid crystal cell 1 (as a referential example) | 300 | 1.7 |

(7) Production of VA-Mode Liquid-Crystal Display Devices:

A polarizer was stuck to the outer surface of any of the two substrates of the above-mentioned liquid-crystal cell as indicated in the following Table, thereby producing a VA-mode liquid-crystal display device. The polarizers were so stuck that the absorption axes thereof could be perpendicular to each other.

As the light source of the thus-produced liquid-crystal display devices, the backlight of LC-42RX1W (by Sharp) was used for the liquid-crystal cells 1 to 4 and 6, and a combination of three BGR LED's for alternate emission at 180 Hz was used for the liquid-crystal 5. The devices were tested and evaluated as follows.

24. Evaluation of VA-Mode Liquid-Crystal Display Devices:

As the VA-mode liquid-crystal cell, the above liquid-crystal cell 1 was used, and this was combined with a polarizer as in the following Table, thereby constructing liquid-crystal display devices of Examples and Comparative Examples.

(1) Measurement of Front Contrast Ratio:

Using a tester BM5A (by TOPCON) in a dark room, the brightness at the time of the black state and the white state in the normal direction to the panel was measured, and from the data, the front contrast ratio (white brightness/black brightness) was computed.

(2) Measurement of Normalized Front Contrast Ratio:

Using a tester BM5A (by TOPCON) in a dark room, the brightness at the time of the black state and the white state in the normal direction to the panel was measured, and from the data, the front contrast ratio (white brightness/black brightness) was computed. In this, the distance between the tester and the panel was set to be 700 mm.

Subsequently, the normalized front contrast ratio was computed according to the following formula, based on the front contrast ratio in a standard state.

Normalized Front Contrast Ratio=(front contrast ratio in sample state)/(front contrast ratio in standard state).

The standard state is Comparative Example 10 in the case of the liquid-crystal cell 1, and the front contrast ratio was 3060.

(3) Viewing Angle Contrast Ratio (Oblique Contrast Ratio):

The degree of light leakage at the time of the black state was measured at an azimuth angle of 45 degrees and a polar angle of 60 degrees from the front of the device. The device having a small value of the degree has a smaller light leakage at an oblique direction of 45 degrees, and has a better display contrast ratio, from which, therefore, the viewing angle characteristic of the liquid-crystal display device can be evaluate.

"Unacceptable" in the following criteria means light leakage recognizable in a light room.

⊚: No light leakage.

◯: Slight light leakage.

Δ: Some moderate light leakage.

Δx: Great light leakage (unacceptable).

x: Serious light leakage (unacceptable).

(4) Color Shift at the Time of the Black State:

Color shift (Δuv) in all azimuthal directions at a polar angle of 60 degrees was determined.

"Unacceptable" in the following criteria means color shift recognizable in a light room.

⊚: Little color shift.

◯: Slight color shift.

Δ: Some moderate color shift.

Δx: Significant color shift (unacceptable).

x: Serious color shift (unacceptable).

(5) Corner Unevenness:

The liquid-crystal display devices were checked for corner unevenness as follows: The device was thermo-treated at 50° C. and 95% RH for 120 hours, and conditioned at 25° C. and 60% RH for 20 hours, and then its backlight was turned on and the device was checked for the light leakage at the time of the black state.

⊚: No light leakage at 4 corners.

◯: Of four corners, some had some but slight light leakage.

Δ: Of four corners, 2 or 3 corners had light leakage (unacceptable).

Δx: Four corners had light leakage (unacceptable).

x: Four corners had noticeable light leakage (unacceptable).

The results are shown in the following Table.

TABLE 10

| Liquid crystal display device | Front-side polarizing plate | | Rear-side polarizing plate | | Front contrast ratio | Normalized front contrast ratio % | Viewing angle contrast ratio | Color shift | Corner unevenness |
|---|---|---|---|---|---|---|---|---|---|
| | Outer protective Film | Inner protective film *1 | Inner protective film *1 | Outer protective Film | | | | | |
| Example 1 | Film 11 | Film 1 | Film 9 | Film 11 | 3182 | 104 | ○ | ○ | ○ |
| Example 2 | Film 11 | Film 2 | Film 9 | Film 11 | 3258 | 106 | ◉ | ◉ | ○ |
| Example 3 | Film 11 | Film 3 | Film 9 | Film 11 | 3196 | 104 | ○ | ○ | ○ |
| Example 4 | Film 11 | Film 2 | Film 9 | Film 9 | 3256 | 106 | ◉ | ◉ | ◉ |
| Example 5 | Film 11 | Film 2 | Film 10 | Film 11 | 3245 | 106 | ◉ | ◉ | ○ |
| Example 6 | Film 11 | Film 2 | Film 10 | Film 10 | 3241 | 106 | ◉ | ◉ | ◉ |
| Example 7 | Film 11 | Film 2 | Film 19 | Film 11 | 3240 | 106 | ◉ | ◉ | ○ |
| Example 8 | Film 11 | Film 2 | Film 20 | Film 11 | 3240 | 106 | ◉ | ◉ | ○ |
| Example 9 | Film 11 | Film 22 | Film 9 | Film 11 | 3240 | 106 | ◉ | ◉ | ○ |
| Example 10 | Film 11 | Film 21 | Film 9 | Film 11 | 3240 | 106 | ◉ | ◉ | ○ |
| Example 11 | Film 11 | Film 17 | Film 13 | Film 11 | 3170 | 104 | ◉ | ◉ | ○ |
| Example 12 | Film 11 | Film 18 | Film 15 | Film 11 | 3100 | 101 | ◉ | ◉ | ○ |
| Example 13 | Film 11 | Film 26 | Film 9 | Film 11 | 3258 | 106 | ◉ | ◉ | ○ |
| Example 14 | Film 11 | Film 27 | Film 9 | Film 11 | 3258 | 106 | ◉ | ◉ | ○ |
| Example 15 | Film 29 | Film 27 | Film 9 | Film 29 | 3258 | 106 | ◉ | ◉ | ○ |
| Example 16 | Film 11 | Film 27 | Film 9 | Film 29 | 3258 | 106 | ◉ | ◉ | ○ |
| Example 17 | Film 29 | Film 27 | Film 9 | Film 11 | 3258 | 106 | ◉ | ◉ | ○ |
| Example 18 | Film 11 | Film 28 | Film 9 | Film 11 | 3250 | 106 | Δ | Δ | ○ |

*1 In Examples, the inner protective film of the rear-side polarizer corresponds to the first retardation film, and the inner protective film of the front-side polarizer corresponds to the second retardation film.

TABLE 11

| Liquid crystal display device | Front-side polarizing plate | | Rear-side polarizing plate | | Front contrast ratio | Normalized front contrast ratio % | Viewing angle contrast ratio | Color shift | Corner unevenness |
|---|---|---|---|---|---|---|---|---|---|
| | Outer protective Film | Inner protective film *1 | Inner protective film *1 | Outer protective Film | | | | | |
| Comparative Example 1 | Film 11 | Film 9 | Film 2 | Film 11 | 2824 | 92 | ◉ | ◉ | X |
| Comparative Example 2 | Film 11 | Film 8 | Film 7 | Film 11 | 2832 | 93 | ◉ | ○ | X |
| Comparative Example 3 | Film 11 | Film 4 | Film 11 | Film 11 | 3058 | 100 | ◉ | ◉ | Δ |
| Comparative Example 4 | Film 11 | Film 11 | Film 4 | Film 11 | 2875 | 94 | ◉ | ◉ | ΔX |
| Comparative Example 5 | Film 11 | Film 6 | Film 6 | Film 11 | 2983 | 97 | ◉ | ◉ | ΔX |
| Comparative Example 6 | Film 11 | Film 10 | Film 2 | Film 11 | 2801 | 92 | ◉ | ◉ | X |
| Comparative Example 7 | Film 11 | Film 24 | Film 25 | Film 11 | 2750 | 90 | ◉ | ○ | X |
| Comparative Example 8 | Film 11 | Film 17 | Film 12 | Film 11 | 3065 | 100 | ◉ | ◉ | Δ |
| Comparative Example 9 | Film 11 | Film 18 | Film 14 | Film 11 | 3065 | 100 | ◉ | ◉ | Δ |
| Comparative Example 10 | Film 11 | Film 18 | Film 16 | Film 11 | 3060 | 100 | ◉ | ◉ | Δ |

*1 In Examples, the inner protective film of the rear-side polarizer corresponds to the first retardation film, and the inner protective film of the front-side polarizer corresponds to the second retardation film.

From the above results, it is known that the VA-mode liquid-crystal display devices of Examples of the invention which have, as the inner protective film of the rear-side polarizer, or that is, as the first retardation film, any of the films 9, 10, 13, 15, 19 or 20 satisfying |Re(590)|≦10 nm, and |Rth(590)|25 nm, all have a high front contrast ratio. Further, these devices are all good in point of the viewing angle contrast ratio, the color shift at the time of the black state and the corner unevenness.

On the other hand, it is known that, in Comparative Example 2 in which the film 7 is used as the inner protective film of the rear-side polarizer, the front contrast ratio lowered. This is because, though the film 7 contains a film satisfying the requirements for the first retardation film, the film 7 contains another film (retardation film 7a) not satisfying the requirements apart from that film, and therefore, the front contrast ratio lowered.

Comparative Example 1 and Comparative Example 6 are the same as Examples 2 and 5, respectively, except that the rear-side polarizer and the front-side polarizer were replaced with each other; but in the former two, the film 2 not satisfying the requirements for the first retardation film exists between the rear-side polarizer and the liquid-crystal cell; and therefore, it is known that the front contrast ratio in the former two lowered.

In Example 18, the front contrast ratio was high like in Example 1, but the viewing angle contrast ratio was low as compared with that in Example 1. This may be because, though the optical properties of the film 28 used as the second retardation film satisfied $\Delta nd(590)-70$ nm$\leq Rth_1(590)+Rth_2(590)\leq \Delta nd(590)-10$ nm, but the data were nearly the lowermost limit.

25. Evaluation of VA-Mode Liquid-Crystal Display Device (Properties of Liquid-Crystal Cell):

Next, VA-mode liquid-crystal display devices were produced in the same manner as that for the liquid-crystal display device in Example 2, for which, however, the liquid-crystal cells 2 to 5 were used in place of the liquid-crystal cell 1, and these were tested and evaluated in the same manner as above. The results are shown in the following Table.

For the normalized front contrast ratio computed according to the following formula, the standard state is as mentioned below.

Normalized Front Contrast Ratio=(front contrast ratio in sample state)/(front contrast ratio in standard state).

The standard state is Comparative Example 10 in the case of the liquid-crystal cell 1, and the front contrast ratio was 3060;

Comparative Example 11 in the case of the liquid-crystal cell 2, and the front contrast ratio was 3080;

Comparative Example 12 in the case of the liquid-crystal cell 3, and the front contrast ratio was 2820;

Comparative Example 13 in the case of the liquid-crystal cell 4, and the front contrast ratio was 2480; and Comparative Example 14 in the case of the liquid-crystal cell 5, and the front contrast ratio was 3950.

liquid-crystal cell 6 therein in place of the liquid-crystal cell 1 was tested and evaluated in the same manner. In the VA-mode liquid-crystal display device, the normalized front contrast ratio could not be enhanced so much, and as compared with the devices in Example 2 and Examples 19 to 22, the normalized front contrast ratio of this device was small. The reason may be because, in the liquid-crystal cell 6, the ratio of (member-contrast ratio of front-side substrate)/(member-contrast ratio of rear-side substrate) was 1.7, and therefore the effect of the invention would be reduced.

The invention claimed is:

1. A VA-mode liquid-crystal display device comprising a front-side polarizing element, a rear-side polarizing element, a VA-mode liquid-crystal cell disposed between the front-side polarizing element and the rear-side polarizing element, and a first retardation region comprising one or more retardation layers between the rear-side polarizing element and the VA-mode liquid-crystal cell, wherein the first retardation region satisfies the following formulae:

$$0 \text{ nm} \leq Re(590) \leq 10 \text{ nm, and } |Rth(590)| \leq 25 \text{ nm,}$$

wherein $Re(\lambda)$ means retardation (nm) in plane at a wavelength $\lambda$ nm, and $Rth(\lambda)$ means retardation (nm) along the thickness direction at a wavelength $\lambda$ nm, and wherein the VA-mode liquid-crystal cell comprises a front-side substrate and a rear-side substrate, and the ratio of the member-contrast ratio of the front-side substrate $CR_f$ to the member-contrast ratio of the rear-side substrate $CR_r$, $CR_f/CR_r$, is equal to or more than 3.

2. The VA-mode liquid-crystal display device as claimed in claim 1, comprising a second retardation region comprising one or more retardation layers between the front-side polar-

TABLE 12

| Liquid crystal display device | Front-side polarizing plate | | Rear-side polarizing plate | | Liquid crystal cell | Front contrast ratio | Normalized front contrast ratio % |
|---|---|---|---|---|---|---|---|
| | Outer protective Film | Inner protective film *1 | Inner protective film *1 | Outer protective Film | | | |
| Example 2 | Film 11 | Film 2 | Film 9 | Film 11 | 1 | 3258 | 106 |
| Example 19 | Film 11 | Film 2 | Film 9 | Film 11 | 2 | 3285 | 107 |
| Example 20 | Film 11 | Film 2 | Film 9 | Film 11 | 3 | 2900 | 103 |
| Example 21 | Film 11 | Film 5 | Film 9 | Film 11 | 4 | 2640 | 106 |
| Example 22 | Film 11 | Film 2 | Film 9 | Film 11 | 5 | 4330 | 110 |
| Comparative Example 11 | Film 11 | Film 5 | Film 11 | Film 11 | 2 | 3080 | 100 |
| Comparative Example 12 | Film 11 | Film 5 | Film 11 | Film 11 | 3 | 2820 | 100 |
| Comparative Example 13 | Film 11 | Film 23 | Film 11 | Film 11 | 4 | 2480 | 100 |
| Comparative Example 14 | Film 11 | Film 5 | Film 11 | Film 11 | 5 | 3950 | 100 |

*1 In Examples, the inner protective film of the rear-side polarizer corresponds to the first retardation film, and the inner protective film of the front-side polarizer corresponds to the second retardation film.

From the results in the above table, it is known that all the liquid-crystal cells 1 to 5 in which the ratio of (member-contrast ratio of front-side substrate)/(member-contrast ratio of rear-side substrate) of the liquid-crystal cell substrates is at least 3.0 were good, as noticeably enhancing the normalized front contrast ratio. The liquid-crystal cell 5 used in Example 22 was the same as a field sequential-mode liquid-crystal cell, or that is, from the above results, it is understood that the effect of the invention is remarkable even in field sequential-mode liquid-crystal display devices.

For reference, a VA-mode liquid-crystal display device produced in the same manner as in Example 2 but using the izing element and the VA-mode liquid-crystal cell, wherein the second retardation region satisfies the following formulae:

$$30 \text{ nm} \leq Re(590) \leq 90 \text{ nm, and}$$

$$170 \text{ nm} \leq Rth(590) \leq 300 \text{ nm.}$$

3. The VA-mode liquid-crystal display device as claimed in claim 2, wherein the first and second retardation regions satisfy the following formula:

$$\Delta nd(590)-70 \leq Rth_1(590)+Rth_2(590) \leq \Delta nd(590)-10,$$

wherein d means the thickness (nm) of the liquid-crystal layer of the VA-mode liquid-crystal cell, $\Delta n(\lambda)$ means the refractivity anisotropy at a wavelength $\lambda$ of the liquid-crystal layer of the VA-mode liquid-crystal cell, $\Delta nd$ ($\lambda$) means a product of $\Delta n(\lambda)$ and d, $Rth_1(\lambda)$ means retardation (nm) along the thickness direction in the first retardation region at a wavelength $\lambda$, and $Rth_2(\lambda)$ means retardation (nm) along the thickness direction in the second retardation region at a wavelength $\lambda$.

4. The VA-mode liquid-crystal display device as claimed in claim 3, wherein the first retardation region is formed of a cellulose acylate film or comprises a cellulose acylate film.

5. The VA-mode liquid-crystal display device as claimed in claim 4, wherein the second retardation region is formed of a cellulose acylate film or comprises a cellulose acylate film.

6. The VA-mode liquid-crystal display device as claimed in claim 4, wherein the second retardation region is formed of a cyclic olefin polymer film or comprises a cyclic olefin polymer film.

7. The VA-mode liquid-crystal display device as claimed in claim 2, wherein the second retardation region is formed of a cellulose acylate film or comprises a cellulose acylate film.

8. The VA-mode liquid-crystal display device as claimed in claim 2, wherein the second retardation region is formed of a cyclic olefin polymer film or comprises a cyclic olefin polymer film.

9. The VA-mode liquid-crystal display device as claimed in claim 2, wherein the first retardation region is formed of a cellulose acylate film or comprises a cellulose acylate film, and the second retardation region is formed of a cellulose acylate film or comprises a cellulose acylate film.

10. The VA-mode liquid-crystal display device as claimed in claim 1, wherein the first retardation region is formed of a cellulose acylate film or comprises a cellulose acylate film.

11. The VA-mode liquid-crystal display device as claimed in claim 10, wherein the cellulose acylate film comprises at least one compound that reduces retardation along the thickness direction, Rth, within a range satisfying the following formulae (I) and (II):

$$(Rth[A]-Rth[0])/A \leq -1.0, \quad (I)$$

$$0.01 \leq A \leq 30, \quad (II)$$

wherein Rth[A] means Rth (nm) of the film containing the Rth-reducing compound in an amount of A %, Rth[0] means Rth (nm) of the film not containing the Rth-reducing compound, and A means the mass (%) of the compound relative to the mass, 100, of the starting polymer for the film.

12. The VA-mode liquid-crystal display device as claimed in claim 10, wherein the cellulose acylate film comprises a cellulose acylate having a degree of acyl substitution of from 2.85 to 3.00 and contains at least one compound capable of reducing retardation in plane, Re, and retardation along the thickness direction, Rth, in an amount of from 0.01 to 30% by mass relative to the solid content of the cellulose acylate.

13. The VA-mode liquid-crystal display device as claimed in claim 10, wherein the cellulose acylate film comprises at least one compound capable of reducing |Re(400)−Re(700)| and |Rth(400)−Rth(700)| of the film, in an amount of from 0.01 to 30% by mass relative to the solid content of the cellulose acylate.

14. The VA-mode liquid-crystal display device as claimed in claim 1, wherein the first retardation region is formed of an acrylic polymer film or comprises an acrylic polymer film.

15. The VA-mode liquid-crystal display device as claimed in claim 14, wherein the first retardation region is formed of an acrylic polymer film comprising an acrylic polymer with at least one unit selected from a lactone ring unit, a maleic anhydride unit and a glutaric anhydride unit, or comprises said acrylic polymer film.

16. The VA-mode liquid-crystal display device as claimed in claim 1, which has a front contrast ratio of equal to or more than 1500.

17. The VA-mode liquid-crystal display device as claimed in claim 1, which comprises a backlight unit sequentially emitting independent three primary colors and is operated according to a field sequential operation mode.

18. The VA-mode liquid-crystal display device as claimed in claim 1, wherein the first retardation region satisfies the following formulae:

$$0 \text{ nm} \leq Re(590) \leq 5 \text{ nm, and } |Rth(590)| \leq 10 \text{ nm.}$$

19. The VA-mode liquid-crystal display device as claimed in claim 1, wherein the first retardation region satisfies the following formulae:

$$0 \text{ nm} \leq Re(590) \leq 3 \text{ nm, and } |Rth(590)| \leq 5 \text{ nm.}$$

* * * * *